(12) United States Patent
Ivanyi et al.

(10) Patent No.: US 8,656,284 B2
(45) Date of Patent: Feb. 18, 2014

(54) METHOD FOR DETERMINING A QUALITY OF USER EXPERIENCE WHILE PERFORMING ACTIVITIES IN IP NETWORKS

(75) Inventors: Tibor Ivanyi, Pelham, NH (US); Anuj Nath, Stoneham, MA (US); David Hsing-Wang Wong, Billerica, MA (US); Sergey Eidelman, Bolton, MA (US); Anne-Marie Turgeon, Wakefied, MA (US)

(73) Assignee: Empirix Inc., Billerica, MD (US)

( * ) Notice: Subject to any disclaimer, the term of this patent is extended or adjusted under 35 U.S.C. 154(b) by 835 days.

(21) Appl. No.: 12/762,240

(22) Filed: Apr. 16, 2010

(65) Prior Publication Data

US 2010/0269044 A1  Oct. 21, 2010

Related U.S. Application Data

(60) Provisional application No. 61/170,263, filed on Apr. 17, 2009.

(51) Int. Cl.
*G06F 15/177* (2006.01)
(52) U.S. Cl.
USPC .......................................................... 715/736
(58) Field of Classification Search
USPC ................................ 715/736, 751
See application file for complete search history.

(56) References Cited

U.S. PATENT DOCUMENTS

| | | | |
|---|---|---|---|
| 6,157,618 A | 12/2000 | Boss | |
| 7,010,598 B2 | 3/2006 | Sitaraman | |
| 7,085,230 B2 | 8/2006 | Hardy | |
| 7,599,307 B2 * | 10/2009 | Seckin et al. | 370/252 |
| 7,647,399 B2 * | 1/2010 | Ofel | 709/224 |
| 2005/0089043 A1 | 4/2005 | Seckin | |
| 2007/0271590 A1 * | 11/2007 | Gulas et al. | 725/118 |
| 2008/0098446 A1 | 4/2008 | Seckin | |
| 2008/0155087 A1 * | 6/2008 | Blouin et al. | 709/223 |
| 2008/0281905 A1 * | 11/2008 | Langer | 709/203 |
| 2009/0106731 A1 * | 4/2009 | Coulthard et al. | 717/101 |
| 2009/0135898 A1 * | 5/2009 | Bauchot et al. | 375/240.01 |
| 2010/0029266 A1 * | 2/2010 | Van Gassel et al. | 455/424 |

* cited by examiner

*Primary Examiner* — Omar Abdul-Ali
(74) *Attorney, Agent, or Firm* — Baker & Hostetler LLP

(57) ABSTRACT

An embodiment of the present invention provides a method for establishing Quality of Experience (QoE) measurements and metrics for different types of actual user activities over IP networks. These activities include, but are not limited to web browsing, sending and receiving email, file downloading and uploading, peer to peer (P2P) networking, VoIP, online gaming, and media streaming. The measurement of the QoE metrics is based on both objective and subjective metrics, including network characteristics, such as packet loss and latency, along with empirical observations of the user activities.

44 Claims, 12 Drawing Sheets

```
GET / HTTP/1.1
HOST: WWW.EMPIRIX.COM
USER-AGENT: MOZILLA/5.0 (WINDOWS; U; WINDOWS NT 5.1; EN-US; RV:1.9.1.3)
GECKO/20090824 FIREFOX/3.5.3 (.NET CLR 3.5.30729)
ACCEPT:
TEXT/HTML,APPLICATION/XHTML+XML,APPLICATION/XML;Q=0.9,*/*;Q=0.8
ACCEPT-LANGUAGE: EN-US,EN;Q=0.5
ACCEPT-ENCODING: GZIP,DEFLATE
ACCEPT-CHARSET: ISO-8859-1,UTF-8;Q=0.7,*;Q=0.7
KEEP-ALIVE: 300
CONNECTION: KEEP-ALIVE
REFERER:
HTTP://WWW.COMMAND.COM/RETURN/15/MBS/
```
700
704
702

```
GET / HTTP/1.1
HOST: WWW.EMPIRIX.COM
USER-AGENT: MOZILLA/5.0 (WINDOWS; U; WINDOWS NT 5.1; EN-US; RV:1.9.1.3)
GECKO/20090824 FIREFOX/3.5.3 (.NET CLR 3.5.30729)
ACCEPT:
TEXT/HTML,APPLICATION/XHTML+XML,APPLICATION/XML;Q=0.9,*/*;Q=0.8
ACCEPT-LANGUAGE: EN-US,EN;Q=0.5
ACCEPT-ENCODING: GZIP,DEFLATE
ACCEPT-CHARSET: ISO-8859-1,UTF-8;Q=0.7,*;Q=0.7
KEEP-ALIVE: 300
CONNECTION: KEEP-ALIVE
ETAG: "REQUEST TIMEOUT"
```
706
708

```
GET /FAVICON.ICO HTTP/1.1
HOST: WWW.EMPIRIX.COM
USER-AGENT: MOZILLA/5.0 (WINDOWS; U; WINDOWS NT 5.1; EN-US; RV:1.9.1.3)
GECKO/20090824 FIREFOX/3.5.3 (.NET CLR 3.5.30729)
ACCEPT: IMAGE/PNG,IMAGE/*;Q=0.8,*/*;Q=0.5
ACCEPT-LANGUAGE: EN-US,EN;Q=0.5
ACCEPT-ENCODING: GZIP,DEFLATE
ACCEPT-CHARSET: ISO-8859-1,UTF-8;Q=0.7,*;Q=0.7
KEEP-ALIVE: 300
CONNECTION: KEEP-ALIVE
COOKIE: DROP.PACKET
```
708
710

FIG. 7

METHOD FOR DETERMINING A QUALITY OF USER EXPERIENCE WHILE PERFORMING ACTIVITIES IN IP NETWORKS

CROSS-REFERENCES TO RELATED APPLICATIONS

This application is a utility patent application, taking priority from provisional patent application Ser. No. 61/170,263, filed Apr. 17, 2009 and incorporated herein by reference.

BRIEF DESCRIPTION OF THE INVENTION

The present disclosure is directed to methods for defining a Quality of Experience score for a plurality of user activities over an IP network; methods for emulating realistic user behavior by defining a set of behavior profiles; and methods for testing edge devices by embedding meta-commands in normal network packets.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

Applications deployed over the web continue to increase and grow in complexity. Web technologies continue to improve allowing users to use the Internet for more than viewing static web pages. Most web pages now are interactive, with the web pages behaving and providing similar functionality to desktop applications. Web pages allow users to edit and create documents, spreadsheets, and presentations; to share information with other users including documents, videos, and images; to view or listen to streaming media; to send and receive email; to place Voice over Internet Protocol (VoIP) calls; and to play online games. The deployment of rich internet application such as ADOBE AIR, JAVAFX, MICROSOFT SILVERLIGHT, and CURL have helped developers create applications which further blur the line between the Internet and the desktop, by allowing users to run web applications as desktop applications. Such technologies allow for the advantages of performance improvements and access to local drives to be combined with online access. Further, plugins for web browsers have also helped condense the user experience to a web browser, by providing a variety of controls through the user interface of the web browser. For example, plugins available for the MOZILLA FIREFOX web browser allow a user to perform activities ranging from playing music from the user's library through the web browser interface, to managing the download of files and peer-to-peer file sharing.

In addition, desktop applications continue to increasingly make use of online access to enhance the user experience. Online access is used by video games to allow a user to play with other users in a local area network or on the Internet. Online access is further used by other applications to deliver regular updates that can be self-executing or installed manually and to allow users to search for additional content not provided by default on a desktop application.

The Internet Protocol Suite (TCP/IP) is a set of communications protocols used for the Internet and other networks, including local area networks (LAN) and wide area networks (WAN). The Internet Protocol Suite model consists of a set of layers, with each layer level providing a different level of functionality and encapsulation. Layers are usually connected to the immediate neighboring layers. For example, in a three layer model, the top layer can send a request to the middle layer, with the middle layer in turn making a request to the bottom layer in order for the middle layer to fulfill the original request by the top layer. Information is passed up and down layers, and any layer is aware of its corresponding top and bottom layers. The TCP/IP model consists of four layers, the application layer, the transport layer, the internet layer, and the link layer. The application layer is the top level layer and the link layer is the lowest level layer. Different protocols are available in each layer. Examples of protocols in the application layer include DNS, TFTP, SSL, FTP, Gopher, HTTP, MGCP, POP3, SIP, SMTP, SSH, Telnet, RTP, RTSP, and XMPP. Example protocols in the transport layer include TCP, UDP, DCCP, SCTP, RUDP, and RSVP. Example protocols of the internet layer include IP, ICMP, IGMP, and ICMPv6. Finally, example protocols of the link layer include ARP, RARP, OSPF, and NDP.

A second protocol layering model is the Open System Interconnection Reference Model (OSI Model), that is analogous to the TCP/IP model but which divides network architecture into seven layers instead of four. The seven layers, from top to bottom, are the application, presentation, session, transport, network, data-link, and physical layers. Protocols in the application layer include NNTP, SIP, SSI, DNS, FTP, Gopher, HTTP, NFS, SMPP, SMTP, and Telnet. Protocols in the presentation layer include AFP, ASCII, ICA, MIME, RDP, XDR, SSL, and TLS. Protocols in the session layer include ASP, NetBIOS, PPTP, RPC TRCP, SMPP, SCP, SSHP, and SDP. Protocols in the transport layer include TCP, UDP, PPTP, and SCTP. Protocols in the network layer include IP, ICMP, IPsec, and IGMP. Protocols in the data link layer include ARP, CSLIP, and SLIP. Protocols in the physical layer include T1, E1, 802.3 Ethernet, DSL, and 802.11a/b/g/n PHY.

A packet is a unit of data routed on a packet-switched network. A packet switched network allows for communication of data by structuring the data into formatted blocks, these being the packets. A packet consists of control information and the user data. The control information provides the network with the necessary information to deliver the data to the intended destination. This information can include source and destination addresses, error detection codes, and sequencing information. It is common for the control information to be encoded in packet headers and trailers.

Different communication protocols use different ways for distinguishing the elements and for formatting the user data. For example, the first four pieces of control information in an IPv4 protocol packet header consists of four bits that contain the version, either IPv4 or IPv6, the next four bits contain the length of the header, the next 8 bits contain the Quality of Service, and the next 16 bits contain the length of the packet in bytes.

Packet contents and the protocol that a packet belongs to can be determined by examining the packet's header. Tools such as packet sniffers or a protocol analyzer capture a packet and analyze its contents according to some specifications.

Considering the complex and multifaceted use of the Internet by a variety of users, there is a need to provide an assessment for the quality of the user experience when using the Internet.

Quality of Experience or Quality of User Experience (QoE) is supposed to be a subjective measure of a customer's experiences with a vendor. In the context of telecommunications networks, QoE is a subjective measure, from the user's perspective, of the overall value of the service provided. As such, it typically includes factors that contribute to the overall user value such as suitableness, flexibility, mobility, security, cost, personalization, and choice.

Attempts to measure and report QoE for VoIP telephone calls has focused on objective metrics that may represent a user's experience. Examples of metrics measured during live VoIP calls include information on packet loss rate, packet discard rate due to jitter, packet loss/discard burst metrics, network delay, end system delay, and signal/noise/echo level. Jitter concerns the variation in the delay between received packets. Latency is the time required for a packet to travel from one point to a second point. A low latency for a packet is desired. A packet loss occurs when one or more packets fail to reach their destination. Packet loss is caused by signal degradation over a network, oversaturated network links, corrupt packets rejected in-transit, faulty networking hardware, faulty network drivers, or normal routing routines.

Attempts have been made to measure more subjective metrics, with one of the more notable metrics for measuring QoE being referred to as Mean Opinion Score (MOS). MOS has a scale of 1-5, with 3 and above considered acceptable. The MOS is generated by averaging the results of a set of standard, subjective tests where a number of listeners listen in and rate the heard audio quality of VoIP phone calls. A listener is required to give each call a rating using the rating scheme shown in Table 1. The MOS rating is the arithmetic mean of all the individual scores.

| MOS Rating | Description |
| --- | --- |
| 5 | Excellent - Imperceptible |
| 4 | Good - Perceptible but not annoying |
| 3 | Fair - Slightly annoying |
| 2 | Poor - Annoying |
| 1 | Bad - Very annoying |

Another metric for measuring QoE is known as the R-factor, and has a scale of 1-100, with 70 and above considered acceptable. R-factor is an alternative method of assessing call quality. Scaling from 0 to 100, as opposed to the limited MOS scale of 1 to 5, makes R-factor a more precise tool for measuring voice quality. R-factor is calculated by evaluating user perceptions as well as the objective factors that affect the overall quality of a VoIP call. Some users believe R-factor to be a more objective measure of the quality of a VoIP system than MOS. MOS ratings can be further broken down by tenths to create a broader scale and compared to the R-factor on a relative basis, as set forth in the following table.

| Description | MOS rating | R-factor |
| --- | --- | --- |
| Very satisfied | 4.3-5.0 | 90-100 |
| Satisfied | 4.0-4.3 | 80-90 |
| Some users satisfied | 3.6-4.0 | 70-90 |
| Many users dissatisfied | 3.1-3.6 | 60-70 |
| Not recommended | 1.0-2.6 | Less than 50 |

Performance measurements have also been proposed for media streaming and Internet connections. For example, U.S. Pat. No. 6,157,618 discloses geographically distributed data-gathering client computers, where each client computer accesses a target site, and records performance values such as load time. However, the client computers poll a central server for a target site to access, and the resulting performance values are sent to the central server for analysis. U.S. Pat. No. 7,010,598 and U.S. Patent Application No. 2007/0271590 A1 present examples of determining quality metrics for streaming media, including assessing video and sound quality. U.S. Pat. No. 7,085,230 discloses determining quality of voice communications in order to determine the acceptability of the quality of a first communication device in comparison to a second communication device. U.S. Patent Application No. US 2008/0098446 A1 presents an example of determining metric data pertaining to the delivery of streaming content to client devices, and using the metric data to switch a client device from a current stream to a more optimum stream based on the metric data. U.S. Application No. US 2005/0089043 A1 discloses QoE metrics indicative of quality in a communication environment. A negotiation between a client and a server is used to determine which QoE metrics to use during a session between the client and the server.

A challenge faced by Internet Service Providers (ISPs) is determining how bandwidth is consumed and what is occurring with their traffic, and determining whether subscribers are satisfied with their service and are getting the expected service quality. For example, evidence suggests that peer to peer (P2P) usage remains one of the biggest consumptions of bandwidth in high bandwidth networks, which can subsequently affect the perceived QoE by other users in the network.

In addition, many ISPs either currently offer, or plan to offer, tier based subscription plans where a certain level of service is guaranteed. Guaranteed services tend to be specific to a set of activities. For example, an ISP may offer a subscription package for gamers, with service guarantees for low latency and a minimum bandwidth. In order to verify subscriber QoE for such subscription services, it is essential for ISPs to test their networks using tools that emulate the realistic subscriber behavior.

In addition, enterprises want to ensure that their networks are able to handle the network traffic load of all their users. Most importantly, they want to ensure that their networks are tested in stress situations such as power outages, failovers and other disaster recovery scenarios. Similarly, network equipment manufacturers need means to test and ensure that their edge devices meet the rigorous demands of ISPs and enterprises. The key testing aspect for providing these services is emulating user behavior in a realistic way, and determining whether service needs are being met from a subscriber point of view.

One method of testing Internet Protocol (IP) networks is to simulate subscriber activities to see how the networks respond. Typically this is accomplished by flooding the network with HTTP requests, and determining how long it takes for the requests to be handled. While this provides a certain degree of testing and information regarding the performance of the network, it does not provide a realistic emulation of typical user behavior. A subscriber does not flood the network with requests, but instead requests a web page, receives the web page, takes a certain amount of time to read the web page, clicks on a link in the webpage, etc.

Edge devices are routers, routing switches, switches, integrated access devices, multiplexers and a variety of metropolitan area network (MAN) and wide area network (WAN)

access points that provide entry points into an enterprise or service provider core networks. An edge device may translate between one type of network protocol and another protocol. In general, edge devices provide access to faster, more efficient backbone and core networks. An edge device may also provide enhanced services, such as VPN support, VoIP, and Quality of Service (QoS). An edge device may or may not modify the traffic it receives, depending on the function of the edge device and the communication protocol(s) of the incoming and outgoing traffic. For example, a simple switch routes the incoming traffic without making any modifications to the incoming packets, whereas an edge device, such as a session border controller, may do some data conversions on the incoming packets before sending the modified packets.

The testing of edge devices typically requires the use of test clients and test servers. This introduces the requirement for synchronizing the behavior between the test clients and the test servers. One solution is to have no synchronization, and to simply allow the test clients to run and receive the corresponding responses from the test servers, collecting the test result information at the client and the server level. The problem with this approach is that the lack of synchronization does not allow for coordinated testing and realistic emulation of a real network. For example, a client may have instructions to send an HTTP request to a server, and the server may arbitrarily respond to the client request based on a set of instructions on the server. The server may respond 30% of the time with the correct response to the client, 10% of the time the server may respond with a response timeout, and 60% of the time with corrupt responses. However, there is no way of enforcing that the server responds to a test client A with a timeout request followed by a valid HTTP response.

A second approach is to introduce synchronization. This requires the test control to be communicated between a server and the test clients, such as by opening a second communication channel. The test control information can then be synchronized between the test clients and the test servers, so that server A knows to respond with a dropped packet to client A, and to respond with a correct HTTP response to client B. This requires a single application controlling the test control information on both sides. For example, the test control entity would inform the server to respond as X to the client Y. Alternatively, there is the issue of two communication channels going out of sync. This would require enforcing synchronization at points during the testing. For example, synchronization could be checked and corrected, if necessary, after every test client has received a response on the current iteration. Or, a synchronization check could be made every time a server received a request from a client. For example, the server could receive an FTP request, and then check through a communication channel for how to respond to the received FTP request based on the originating client. Without synchronization the testing can be invalidated, not realistic, or not reflect the intended test procedure. In addition, the communication of test control information during synchronization of the test clients and the test servers consumes bandwidth and introduces a computational overhead.

Piggybacking refers to the act of riding on the back of something else. In data transmission, piggybacking has been used to send successful receipt acknowledgements in a packet. For example, piggybacking is used in TCP connections where instead of sending an immediate acknowledgement that packet X was successfully received by entity B from entity A, entity B can wait until it must send a response to entity A, and in that response piggyback the acknowledgement for packet X or any other packet yet to be acknowledged to entity B.

BRIEF DESCRIPTION OF THE SEVERAL VIEWS OF THE DRAWING

FIG. 7 illustrates examples of HTTP requests with control commands embedded in the normal HTTP requests;

DETAILED DESCRIPTION OF THE INVENTION

Figure 1:
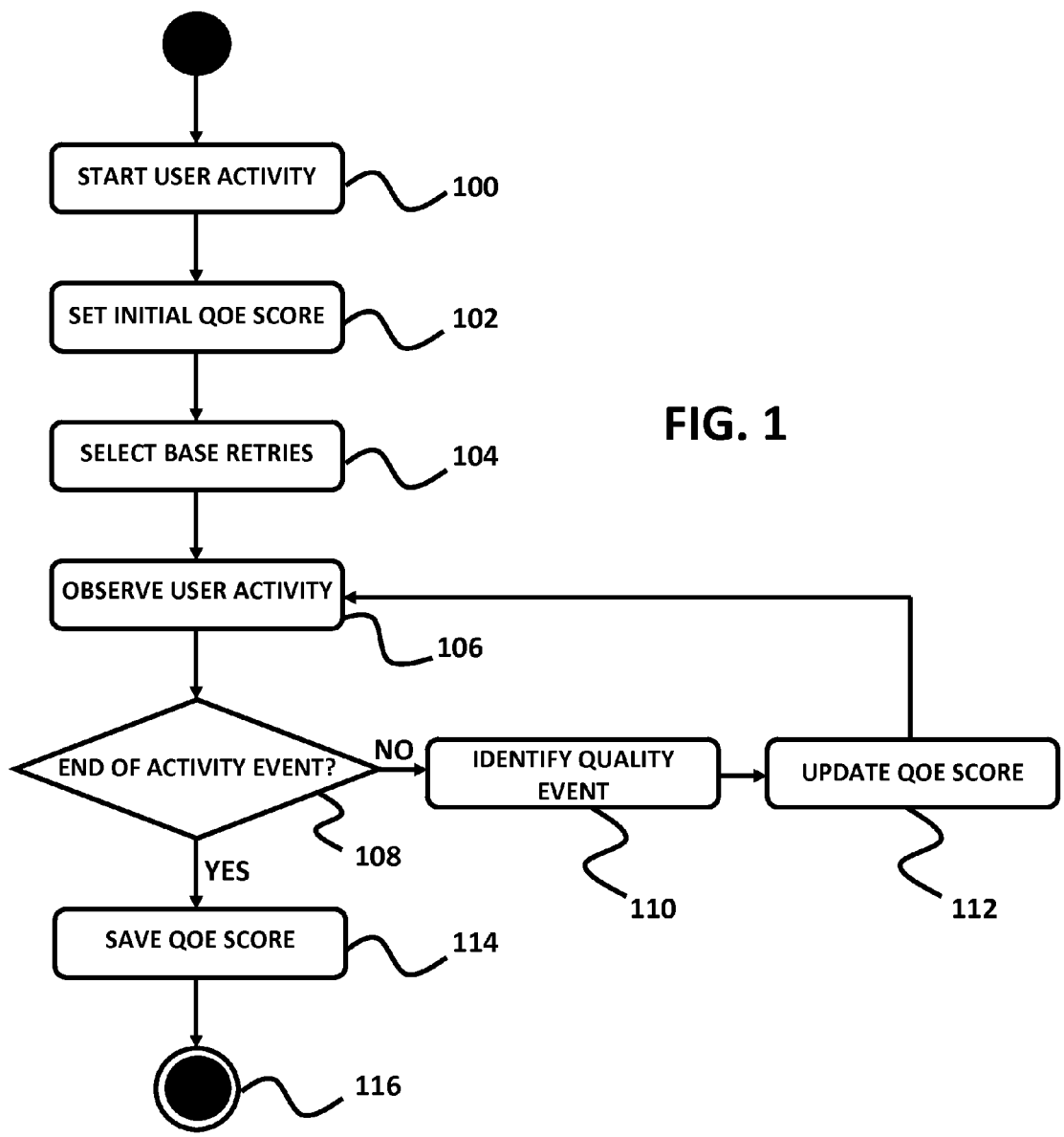
FIG. 1 illustrates an activity diagram for the process of updating the QoE score during a user activity.

An embodiment of the present invention provides a method for establishing Quality of Experience (QoE) measurements and metrics for different types of actual user activities over IP networks. These activities include, but are not limited to web browsing, sending and receiving email, file downloading and uploading, peer to peer (P2P) networking, VoIP, online gaming, media streaming, etc. These QoE metrics are defined using a single scale, where the scale can range from a minimum value to a maximum value, such as 1-100, with 100 being the maximum value; 0-1, 50-100, or the like. It should be noted that the present embodiment is not limited to any specific set of range of values.

The term "user" refers to a subscriber of an ISP. The term "testing user" refers to a system administrator, an ISP, or other entity that may test various aspects of the networks and equipment used to provide Internet service to subscribers.

Using these metrics the user experience can be assessed over a wide range of activities for users. The measurement of these QoE metrics is based on both objective and subjective metrics, including network characteristics, such as packet loss, latency, along with empirical observations of the user activities. These QoE metrics represent the actual experience of a real user who is performing activities. The following table illustrates an example consisting of four user activities along with the respective QoE score for each user activity measured on a scale of 1 to 100, with 100 being the maximum score.

| User Activity | QoE Score |
|---|---|
| Browsing the Web | 78 |
| Sending an Email | 80 |

-continued

| User Activity | QoE Score |
| --- | --- |
| Transferring a File | 50 |
| Placing a VoIP call | 82 |

In this example, it can be determined that the Quality of Experience score is overall good, except with respect to transferring files. A determination can be made regarding the QoE score for a user based on the user activities. For a household that has a first user who only places VoIP calls, sends email and browses the web, the QoE is acceptable. For a second user who mainly uses the network for transferring files, such as using a P2P application to download television show episodes, the service may not be acceptable. An ISP can then offer different levels of service based on the user activities and needs, thereby maintaining customer satisfaction.

An embodiment consists of a method for establishing a quality of experience (QoE) score for a user activity from a plurality of user activities performed by a user over an IP network, comprising the steps of setting the QoE score for the user activity to an initial value; measuring one or more network characteristics from a plurality of network characteristics and resulting in one or more network characteristics metrics, the one or more network characteristics associated with traffic generated by the user activity; raising one or more quality events from a plurality of quality events in response to a result of the one or more network characteristics metrics; and updating the QoE score in response to the one or more quality events.

The user activity is selected from the group consisting of web browsing, sending email, receiving email, downloading a first file, uploading a second file, peer to peer file sharing, Voice over Internet Protocol (VoIP), online gaming, media streaming, and secure session. Secure session is selected from the group consisting of a virtual private network session and a hypertext transfer protocol suite secure session. The one or more network characteristics are selected from the group consisting of a packet loss, a packet jitter, a packet latency, a corrupted packet, and a fulfill request time. In addition, the one or more network characteristics can be counted in back to back occurrence, or in occurrence per a fixed time period.

A further step is comprised of accepting a subjective score for the user activity from the user. The subjective score can be a number, or a selection of a verbal response among a set of verbal responses to a statement. The subjective score can be accepted from the user at the end of the user activity, or alternatively it can be accepted from the user only once over a period of time. A value for the period of time can be accepted from the user.

An additional step compares the subjective score with the QoE score. One or more additional network characteristics from the plurality of network characteristics can be added to one or more network characteristics in response to a difference between the subjective score and the QoE score being greater than a threshold. In addition, an outlier network characteristic can be removed from the one or more network characteristics if a contribution from the outlier network characteristic to the QoE score is greater than an outlier threshold.

An importance level can be associated with the user activity. The user can specify the importance level. A second user can also specify the importance level. The second user is selected from the group consisting of a system administrator and an internet service provider. An embodiment further comprises the step of adjusting the QoE score based on the importance level.

The method further comprises the step of allowing the user to define a new user activity. The new user activity consists of one or more user activities from the plurality of user activities. The method further comprises the step of allowing the user to specify an application, a port number, or a regular expression associated with the new user activity or with the user activity.

The method further comprises the step of allowing the user or a new user to specify an expected experience level for the user activity.

The method further comprises the step of displaying on a display of a computer of the user the QoE score. The method further displays a diagnosis associated with the QoE score.

The recited step of measuring one or more network characteristics further includes the step of detecting the traffic generated by the user activity based on a port number, or based on a list of active network connections. The list of active network connections can be parsed using one or more regular expressions associated with the user activity. The user can customize the one or more regular expressions. The traffic generated can also be detected using shallow packet inspection, deep packet inspection, a packet sniffer, an application programmable interface of an application associated with the user activity, or using a proxy. The proxy can reside on a web browser, a modem, or a router used by the user.

An embodiment of the present invention provides a method of measuring a QoE comprising of the steps of measuring all activities performed over an IP network, instead of restricting measurements to just VoIP and media streaming. A set of metrics are used to assess the Quality of Experience for various types of activities that can be performed by a user over an IP network. The QoE can be measured by examining several properties of packets received across a network. For example, this can include assessing packet jitter and latency, counting the number of packets lost per minute or per a fixed period of time, counting the number of packets lost back to back, counting the number of corrupted packets, measuring the amount of time to fulfill requests using various communication protocols, and the like. These measurements can be accumulated for a period of time, such as per minute, or every five minutes, or every hour. For example, the number of packets lost, packets dropped, or corrupted, can be counted every minute, with the average per minute used to provide an assessment of the QoE for a given user activity. The QoE score can also be used to diagnose problems associated with a user activity, with the network, or with the user's computer.

The set of network characteristics measured for a given user activity is directed by the type of user activity. This can be done without relying on a negotiation between a client and a server to determine the metrics to use to compute QoE for the user activity. Further, the QoE measurement for a user activity can be done at the client level, at the server level, at a proxy level, or using a combination of these levels. If the QoE measurement for a user activity is done in one place only, such as, only on the client or only on the server, then the other network elements need not be notified or made aware of this. For example, if the QoE metric measurement is done at the client side, on a user's personal computer, then the server or the corresponding proxy or gateway need not be aware of, or be notified of the QoE measurement. Packets can be intercepted for analysis and QoE measurements, but packets need not be modified in any manner, making the process transparent to the user and to external network components. Similarly, if the QoE measurement was done automatically at the user's modem or router, then the server transmitting packets to the client would not have to modify its behavior or the manner in which traffic is delivered to the client.

An embodiment of the present invention provides a method where the user can further provide a score at the end of a user activity regarding the overall experience. For example, at the end of a web browsing activity, the user can provide a subjective score between 0 and 100, with the subjective score representing the user's overall level of satisfaction while engaged with the measured activity. The subjective score range is not restricted to 0-100, instead any range with a minimum value and a maximum value can be used as well. For example, a range can be made up of a series of letters, such as A-F, where A is the maximum value and F the lowest value. Similarly, graphical icons can also be used, such as stars, clapping hands, thumbs up, smiling faces and the like to indicate the level of the user's satisfaction. For example, the user could select five stars out of a possible range of one to five to show a maximum value. Alternatively, the user can provide a subjective score by answering a question, or by stating how much the user agrees or disagrees with a statement related to the user's experience. For example, the user can be asked, "How strongly do you agree or disagree with the following statement: 'My web browsing session was fast and responsive.'" The user can be given a range of responses, ranging from strongly agree to strongly disagree, and each response in the range of response can be converted to a numeric number for data analysis. The user can also be asked a simple yes or no question, such as whether the user was able to perform the user activity without any problems.

A dialog box or window can pop up at the end of the user session allowing the user to provide the subjective score. This score can then be added to the overall QoE score computed from measured network characteristics, or it can be averaged together with the overall QoE score. Alternatively, the user can be asked to provide the subjective score at the end of every X user activity, such as one out of every five or ten times the user engages in the activity, instead of asking the user to provide the subjective score every time the user activity is performed. The user can also specify how often the user wishes to provide the subjective score. For example, the user may specify that he/she wants to provide a subjective score only once a month.

Inconsistencies between the overall QoE score and the subjective score provided by the user can indicate a problem with the user's computer. For example, if the user receives a high QoE score for a user activity, but the user provides a low subjective score, then the problem in the overall experience could be attributed to the user's computer running at subpar performance, resulting in the user perception that the unsatisfying experience was due to poor performance on the part of the IP network, when in fact the poor performance could have been due to the use of a computer with low-end hardware, such as a slow processor, or a low amount of memory. Alternatively, the computer may be infected with malicious software, such as a virus, adware, or spyware, making the computer run with poor performance and low responsiveness.

The inconsistency between the QoE score for a user activity and the user provided subjective score can be determined in various ways. For example, the absolute value of the difference between the QoE score for the user activity and the subjective score for the user activity could be a measure of inconsistency. If the difference is greater than a threshold, then a flag could be raised indicating an inconsistency in the expected user experience and the actual user experience. It is expected that the user provided subjective score may vary and will not be equal to the actual QoE score for a user activity. The difference can be allowed to vary within a reasonable margin. For example, if the difference is less than 10, 20, or some other value deemed appropriate, then it would not be considered an inconsistency.

Inconsistencies between the QoE score for a user activity and the user provided subjective score can also be used to tune the set of network characteristics measured for each user activity. For example, after computing the QoE score for a user activity and receiving the subjective score from the user, a dialog box can be displayed to the user displaying the respective QoE score and notifying the user that the inconsistency between the QoE score and the subjective score may be due to problems with the user's computer, such as, due to the software (operating system or browser) or to the hardware. The user may then independently diagnose the computer, and find that the computer is running reasonably well. The user may then open the QoE measurement window or a QoE diagnosis dialog, and specify that the computer is running well. This could further trigger a different set of metrics to be measured. For example, it may be found that packet latency should be used for media streaming, but it is not appropriate for instant messaging. Metrics that may not be appropriate for providing an accurate assessment of the performance of a user activity can be identified by looking at the overall contribution of a given metric to the overall QoE score. For instance, a metric may provide scores consistently higher or lower than the other metrics. If the metric is one or more standard deviations away from the average of the other metrics, then it can be considered as an outlier, and subsequently be identified as a candidate to be removed from the metric set used for the current user activity.

An embodiment of the present invention provides a method of providing a QoE score for each user activity by identifying the traffic generated by each user activity. For example, all of the packets received for normal web browsing would be analyzed in order to give a web browsing QoE score. The packets generated and received as a result of web browsing would be differentiated from the packets generated and received from other user activities that the user may be engaged in concurrently. A user may be web browsing while at the same time listening to an online radio streaming music. In this case, the packets associated with music streaming would be differentiated from the web browsing packets. Other types of activities that a user may engage in include file download and upload, P2P networking, online gaming, placing VoIP calls, instant messaging, and exercising secure sessions such as a virtual private network (VPN) session or a hypertext transfer protocol suite secure (HTTPS) session and the like A further embodiment of the present invention provides a method where an importance level can be assigned to each user activity. The relative importance can be set by default or can be set by a subscriber or by the ISP interested in the quality service being delivered to users/subscribers. For example, a user interested primarily in online gaming and web browsing can assign a high importance level to these two user activities, while assigning a low importance level to the rest of the user activities. The importance level can then be used to weigh the respective QoE score for each user activity. For example, the user doing primarily online gaming and web browsing would consider a high QoE score for these two activities extremely important, and can assign a high importance level to these activities. The importance level can be a numeric value, between 0 and 1, between 0 and 100, or consist of any other range of values.

Each user activity will have a number of factors, or network characteristics, associated in order to compute the corresponding QoE score. These network characteristics can include latency, packet jitter, corrupt packets, lost packets, or the like. A number is assigned to each of these network characteristics. For example, if packets are lost back to back, then a value of 10 can be subtracted from the QoE score for the current user activity. For every corrupt packet, a value of one can be subtracted from the QoE score. If X packets are received consecutively without any jitter, then a value of 20 points can be added to the QoE score. The methods that can be used to update the QoE score can depend on the network characteristics, on the user activity, on the usage patterns of the user, on the user's perceived performance and provided subjective score, and the like. As is noted above, there exists a myriad of parameters or characteristics that can be used in the present embodiment. It should be noted that these parameters or characteristics serve only to exemplify the present embodiment, and that the embodiment is not limited solely to those described. It is further understood that additional parameters or characteristics not presently disclosed, but readily known to those of ordinary skill in the art, are encompassed within the present embodiment.

The values generated based on the measured network characteristics can be refined according to the needs of the user collecting the data by employing a variety of methodologies readily known to those skilled in the art. For example, the valued can be averaged together; if numbers are used they can be combined using a linear weighted sum; or the two highest numbers or the two lowest numbers can be averaged together or added together. As shown above, there are many ways in which the values generated for each network characteristic can be refined.

A further embodiment of the present invention provides that scores received at the beginning of the user activity are weighted lower than scores received later in the user activity. For example, the first score at the beginning of the session can be reduced by half, the second score at the beginning of the session can be reduced by a third, etc. Weighting scores at the beginning of a user activity lower than scores received later in the user activity is done in accordance to the empirical observation that the experience of a user is more greatly influenced by recent events than by past events.

The QoE measurements are calculated based on a set of quality events that influence the QoE score. The set of quality events, in turn, are based on a set of rules that are formulated using empirical observations and base metrics. Base metrics are derived directly from the network characteristics.

User activities consist of browsing the web, downloading a file, streaming media (video or audio), sending an email, placing VoIP calls, playing an online game, instant messaging, file sharing using peer-to-peer technologies, and exercising a secure session like VPN/HTTPS. An embodiment of the present invention provides a method of defining compound user activity comprising the steps of combining one or more user activities. For example, a user might only be interested in activities such as web browsing and email versus online gaming. In that case, the user can define a new user activity consisting of the web browsing and email activities. In addition, a new type of user activity could be defined by identifying an application or the type of traffic associated with the new type of user activity. For example, a new user activity can be added to determine a QoE score for text-based web browsing. The user could specify that all traffic generated by an application, such as LYNX, or the traffic received at a specific port number be used to determine the metrics for the user activity of text-based web browsing.

Base metrics include time between a request and a response, the predicted activity duration, the actual activity duration, variation or changes in predicted activity during the activity, and activity failures. Nevertheless, further base metrics can be defined. The time it takes to load a web page, starting with the client request for the webpage and the server response, is the total time between the client request and the corresponding server response. If downloading a file, the predicted activity duration can consist of the expected time to download the file. In the case of web browsing, the predicted activity duration can consist of the expected time for the webpage to load. The predicted activity duration can also be computed by using the current connection speed as a reference for the amount of time necessary to fulfill a request of a given size. The manner in which the base metric is computed can depend on the actual user activity being performed by the user, the communication protocol involved, and the appropriateness of a method to provide an accurate assessment of a user activity.

The actual activity duration base metric can be computed by measuring the time between when an activity was started and when the activity ended. This can vary considerably depending on the type of activity. For example, when downloading a file, the actual activity duration is the amount of time starting when the file download is requested and ending when the file download ends. When web browsing, the actual activity duration will depend on independent webpage requests made.

It is typical for the predicted duration of an activity to vary based on a number of factors. For example, download dialog boxes are commonly used that show the progress of a remote file being downloaded to the computer of a user. These download dialog boxes include progress bars that slowly increment based on the estimated amount of time for the download to finish. The estimated time not only depends on the user's computer and the user's network connection, but can also depend on factors outside of the user's control. For instance, the router or modem purchased by the user may be faulty, causing it to drop packets or to prematurely timeout connections. The estimated time may also depend on the traffic load experienced by the server hosting the file being downloaded. While this example is illustrated in reference to file downloading, similar factors can affect the estimated amount of time to complete other user activities performed over a network. Tracking changes in the estimated amount of time for an activity (predicted activity duration) can give an additional measurement for the quality of user experience.

In relation to the file download example, if the download dialog informs the user that the download will complete in about 30 minutes, then this allows the user to plan out or perform other activities in the meantime. If the given estimate were to drop from 30 minutes to 5 minutes, then this would likely result in a positive reaction from the user since he/she would have to wait less. On the other hand, if the user is informed that the activity will take approximately 30 seconds, and after making the user wait, the estimate goes up to 10 minutes, then this would likely result in a negative reaction from the user since he/she may associate the increase in time with a network or computer problem. Thus, the number of times and the amount by which the predicted activity duration changes are good indicators of the user experience. The predicted activity duration changing from 30 seconds to 45 seconds is bound to be indifferent to the user. Whereas a change from 30 seconds to 5 minutes, followed by a change from 5 minutes to 10 minutes, is bound to frustrate the user.

An embodiment measures the variation in predicted activity duration by looking at the largest change in predicted activity duration while the user performs the activity. For example, a user begins a file download and the user is informed that the file download will complete in two minutes (predicted activity duration is two minutes). However, after a few seconds the time to complete the download changes from two minutes to 20 minutes. In this case, the variation in predicted activity duration would be the difference of two minutes and 20 minutes, for a total of 18 minutes.

All such changes in predicted activity duration can be recorded either in memory or in a file, keeping track of the largest such change for the current activity. Alternatively, the variation in predicted activity can be measured by counting the number of times that the predicted activity duration fluctuates. For example, a file download may have taken one minute to complete (activity duration equal to one minute), but the estimate given to the user may have fluctuated drastically between one minute and 20 minutes a total of 10 times during the one minute, perhaps resulting in user confusion and frustration due to the lack of consistency. In this case, the variation in predicted activity duration would be set to 10, for the total of 10 times that the estimate given to the user fluctuated. The values obtained could be further normalized or adjusted by other means if necessary. For instance, if the predicted activity duration was greater than 10, then the measurement would be equal to 0. If the predicted activity was between 5 and 10, the measurement would be equal to 0.5, etc.

Activity failures will depend on the type of user activity. For example, if the user is browsing the web, then a not found webpage or a request to a webpage timing out would be considered activity failures. In a different user activity, such as in placing a VoIP call, a dropped call can be an activity failure. In a file download activity, the download being canceled or timing out can be recorded as an activity failure.

Network characteristics are analyzed to derive the base metrics, which are subsequently used to determine the QoE score for each user activity. An embodiment of the present invention provides that the network characteristics analyzed comprise of network throughput, packet loss, packet latency and jitter, link failures, and device failover. The base metrics result in a set of quality event rules. The set of quality event rules can be set by default, but the default event rules can be further customized by the user. For example, a quality event rule from the set of quality event rules can specify that if an activity failure is detected, the QoE score is set to zero; a second quality event rule can specify that if the variance between the predicted and the actual duration is greater than 20%, then a value of 10 is subtracted from the QoE score; or a third quality event rule can specify that if the predicted duration is equal to the actual duration, then a value of 20 is added to the QoE score.

Regardless of the network characteristics measured, and the methods used to measure the network characteristics, the measurements obtained can be normalized or further adjusted if necessary without departing from the scope and spirit of embodiments.

An embodiment of the present invention provides a method where the QoE score can be set to an initial QoE score, where the initial QoE score is set according to the type of user activity, or is set with a default value. The QoE score would then be updated according to quality event rules that match various conditions associated with the base metrics. The QoE score can be updated by changing the current QoE score by a certain value herein referred to as a "QoE update." For example, a quality event rule can add a value of 10 to the current QoE score, while a second quality event rule can divide the current QoE score by two. Another embodiment of the present invention provides a method where the QoE update can be saved on an array in memory or saved to a local disk. At the end of the user activity, the array or data saved to the local disk containing the QoE updates can be retrieved, and the QoE updates can be weighted according to their time of occurrence. The QoE updates can be weighted differently depending on their time of occurrence. For example, QoE updates that occurred at the beginning of the user activity can be weighted lower than QoE updates that occurred at the end of the user activity. The weighted QoE updates can then be added together to provide the overall QoE score for the current user activity. A higher weight value can be given to more recent QoE updates since a user is more likely to end the user activity with a negative impression if the performance of the user activity degrades over time or as the user is about to end the user activity. Similarly, if the user activity begins with poor performance, and improves over time, then the user is more likely to be left with a positive impression.

The QoE score for a user activity is meant to reflect the experience of the user while performing that activity. For example, if a web browsing session for a user begins poorly, by having many dropped or corrupt packets and experiencing a high latency, then this will result in the overall score for the user activity dropping considerably. It would then take a series of positive events to raise the QoE score to a reasonable score for the current session.

An embodiment of the present invention provides a method where the QoE updates can be plotted and displayed to the user as a line plot, or using an alternative graphic representation. This can allow a user to visually inspect and diagnose problems that may be encountered when performing a specific user activity.

An embodiment of the present invention provides a method where an expected experience level can be provided for each user activity. Alternatively, the user can specify a single expected experience level for all user activities. The expected experience level can be used for weighing the scores for each of the user activities. This expected experience level can be reflective of what the subscriber expects of the experience based on the connection speed or the type of equipment being used to perform the subscriber activities. For example, if a subscriber is using a modem line, then the expected experience level would be low compared to a subscriber using a DSL line or a T1 line, or to a user with a high-end computer with a high speed internet connection.

An embodiment of the present invention provides a method where the QoE scores for each user activity can be used for diagnostics. For example, the contributing factors or network characteristics responsible for making a QoE score low or high can be determined. A diagnostic dialog box or window can display to the user potential causes for a low QoE score. For example, the dialog box may display to the user that the low QoE score is due to high latency or because too many packets were corrupt. Specifically, the user could be informed that the reason for the user activity of file downloading receiving low QoE scores is due to too many lost packets. Knowing which factors contributed the most to a low score or a high score, can serve as a diagnostic for issues that the user may be able to resolve, either by replacing a hardware component or by sending a notification to the service provider. Alternatively, as previously discussed, if the QoE score does not reflect the actual user experience, then this can serve as a diagnostic that it is the user's hardware or other software processes running on the user's computer that can be the potential cause for the perceived low performance.

Different applications tend to use different port numbers to receive incoming traffic. By identifying the traffic from each port, the traffic associated with different user activities can be identified and analyzed for the corresponding QoE measurement. There are a common set of ports reserved for certain applications and processes. For example, port 80 is usually reserved for HTTP requests, ports 20 and 21 are reserved for FTP control commands and data respectively, port 70 is reserved for the GOPHER protocol, etc. Applications also tend to have reserved ports, even though the ports may be reserved unofficially. For example, the AIM instant messaging client runs on port 531, while the YAHOO! Messenger client runs on port 5050. The port number used by a specific application can be changed to a different port number if necessary.

Software running on the client side, on the user's computer, makes use of port numbers to communicate with a remote server. For example, a web browser may open several ports, one port for each webpage currently being viewed by the user. The port number used depends on the number of ports already taken and the manner in which new ports are allocated. By intercepting the traffic from each port handling a TCP or UDP connection, or any other protocol, the traffic from the corresponding port can be automatically associated with a user activity, until the connection on the port is closed. For example, a list of all active network connections can be retrieved that list active TCP and UDP connections. The list of network connections can be generated by using network statistics tools that query the local computer for active ports and display incoming and outgoing network connections, as well as the current state of the connections. An example of a network statistic tool is NETSTAT. The list of network connections can list the port number, the status for each port number, and the domain name or IP address of the remote server.

The list of network connection can be analyzed to determine whether specific substrings match the name, or other fields, of an entry in the list of network connections. For example, if a network connection name contains the substring "pandora", then the traffic received at the corresponding port number would be associated with the user activity of media streaming. In many instances, the name of a webpage or domain name can help identify the corresponding user activity. A list of specific substrings associated with a user activity can be defined using regular expressions. The use of regular expressions is well known in the art.

An embodiment of the present invention provides a method where the user can modify a list of specific substrings associated with a user activity. For example, the user may add the strings "youtube" and "vimeo" for the user activity of media streaming. The user may also define the list of specific strings for a new user activity. For example, the user may define a new user activity for flash-based online gaming, adding the string "pogo" to the corresponding list of specific substrings for this new user activity.

Alternatively, the analysis and interception of packets can be done by a proxy on the web browser, or by a service running transparently to the user, which can request from the web browser the current URL being visited by the user. For example, if the user accesses email through a webpage, such as YAHOO mail, GMAIL, or HOTMAIL, then the corresponding traffic can then be associated with the user activity of sending and receiving email by either identifying the URL name or by searching for a substring containing the word "mail" or a variation of the word.

An embodiment of the present invention provides a method where the association of packets to a type of network traffic is done by combining shallow packet inspection with the list of active network connections. Shallow packet inspection extracts basic protocol information by looking at the information contained in the packet header. This basic information is usually limited to originating and destination IP addresses and the corresponding port numbers. The destination port number in a packet header can be mapped to a specific application by looking at the list of active network connections. If the port is not listed in the list of active network connections, then the port can be searched in a list of commonly used port numbers. For example, a first port may not be listed on the list of active network connections, but it may be found to be the SSH port by doing a lookup on the list of commonly used port numbers.

An embodiment of the present invention provides a method where deep packet inspection (DPI) can be used to determine the type of traffic or application associated with a packet. Deep packet inspection extracts and examines a packet's header, the data protocol structures associated with the packet, and the actual content of the message.

Packet sniffing using DPI faces several challenges. For example, DPI may not be permitted if net neutrality and eavesdropping laws prohibit accessing DPI even for statistical measurements of QoE for a user. This is further complicated by adaptive applications that rely on a peer-to-peer network architecture, such as BITTORRENT and SKYPE. These adaptive applications tend to have viral properties, in that if existing connections from a peer to a set of peers are disconnected or interrupted, the peer can search for and build a new different set of connections to a second set of peers. The P2P network architecture used by these applications allow for scalability. In addition, applications such as BITTORRENT and SKYPE can be combined with encryption, making it difficult to identify the properties of a packet across a network.

An embodiment of the present invention provides a method where the traffic generated and received by applications with peer-to-peer network architectures, with closed-source protocols, and which make use of encryption, can be analyzed by querying the application on the client side. Encrypted packets received by a client are decrypted by the corresponding receiving application; otherwise the receiving application would not be able to make use of the received data. By using an application programming interface (API) of the application, if available, information related to the received traffic can be obtained via queries. For example, an application such as SKYPE, which makes use of encryption as well as a closed-source protocol, can be queried through SKYPE's API. This would allow for SKYPE generated and received traffic to be analyzed to compute a QoE for the user activity of VoIP.

Another embodiment of the present invention provides a method where a packet sniffer can be used to detect the type of traffic being received by the subscriber and using this to measure the base metrics for the different types of user activities. The packet sniffing may be done by the service provider at a gateway, at a server, or at an edge device using deep packet inspection. Alternatively, the packet inspection can be conducted at the end-user computer, client side. Examples of packet sniffers that operate at the client side include MRTG, PRTG, WIRESHARK, and PACKETEER.

FIG. 1 shows an activity diagram for computing the QoE score for a user activity. In step 100 the user activity is started. The start of a user activity can be detected by either receiving a notification from an application associated with a user activity, or by detecting that a packet has been intercepted for a new user activity. For example, for simple web browsing, starting a web browser by selecting the web browser program in the user's computer would start the web browsing user activity, while starting an instant messaging client application would start the instant messaging user activity. However, some user activities can be carried out using the same end-user application. For example, the web browser can be used for several user activities, which can include simple web browsing, streaming media, downloading a file, sending an email, placing VoIP calls, playing online games, instant messaging, peer-to-peer file sharing, and exercising secure sessions, among others. In this case the generated traffic can be intercepted and analyzed to determine which user activity the user is engaged in.

Step 102 sets the initial QoE score. The initial QoE score can depend on the type of user activity being performed by the user. For example, if the user activity is web browsing, then the initial QoE score can be set to 50, while the initial QoE score for VoIP can be set to 0. The initial QoE score can be set to a default value or it can be set manually by the user or service provider. Alternatively, the initial QoE score can be set based on an expected performance value. For example, a user may expect web browsing to perform well, based on past experiences, but may expect file downloading to be low. The initial QoE scores could then be assigned accordingly, with web browsing starting with a high value and file downloading starting with a low value.

Yet another embodiment of the present invention provides a method where the last QoE score for a user activity can be used as the initial QoE score of the current session. For example, if during the last session the QoE score for simple web browsing was 88, then the initial QoE score can be set to 88 for the current web browsing session. Alternatively, all of the previous resulting QoE scores for a user activity can be combined or analyzed to determine the current initial QoE score. For example, all of the previous QoE scores can be averaged, or otherwise processed as discussed previously. Alternatively, only the previous N QoE scores can be used to determine the initial QoE score, such as the last two QoE scores, the last five QoE scores, etc. Previous QoE scores can also be weighted differently. Outlier QoE scores, such as the largest and the lowest QoE scores, can be discarded or weighted lower than the rest of the QoE scores. The QoE scores can also be weighted with less importance relative to how old the QoE scores are. For example, if there are three QoE scores available, then the most recent QoE score can be weighted as 0.5, while the other two QoE scores can be weighted as 0.25 and 0.25.

Step 104 selects the corresponding base metrics relevant to the type of user activity. Each base metric is then measured by looking at specific network characteristics. In step 106 the user activity is observed in order to detect a quality event. This process comprises of the steps of capturing packets associated with the user activity, measuring various network characteristics, and raising the corresponding quality event based on the result of the base metrics. If the end of the user activity is detected 108, then the current QoE score is saved 114 and the process ends. If any other event or events are detected based on the result of the base metrics, then the event is raised and the event is identified 110. The QoE score is then updated based on the type of quality event received 112. For example, if two packets are lost back to back, or if 10 packets are lost in a row, then an event can be raised, with the corresponding event rule updating the QoE score by subtracting 10 from the QoE score.

Raising an event consists of adding an event to an event queue, which is then processed by an entity or module that detects whether new events have occurred. The detecting entity or module then allows for an event handler assigned to the specific event type to perform a set of functions or processes in response to the raised event. Different programming languages and libraries have different means for carrying out the raising of events, the detecting of events, and the assignment of handlers to certain events. Event-driven programming is well known in the art.

Figure 2:
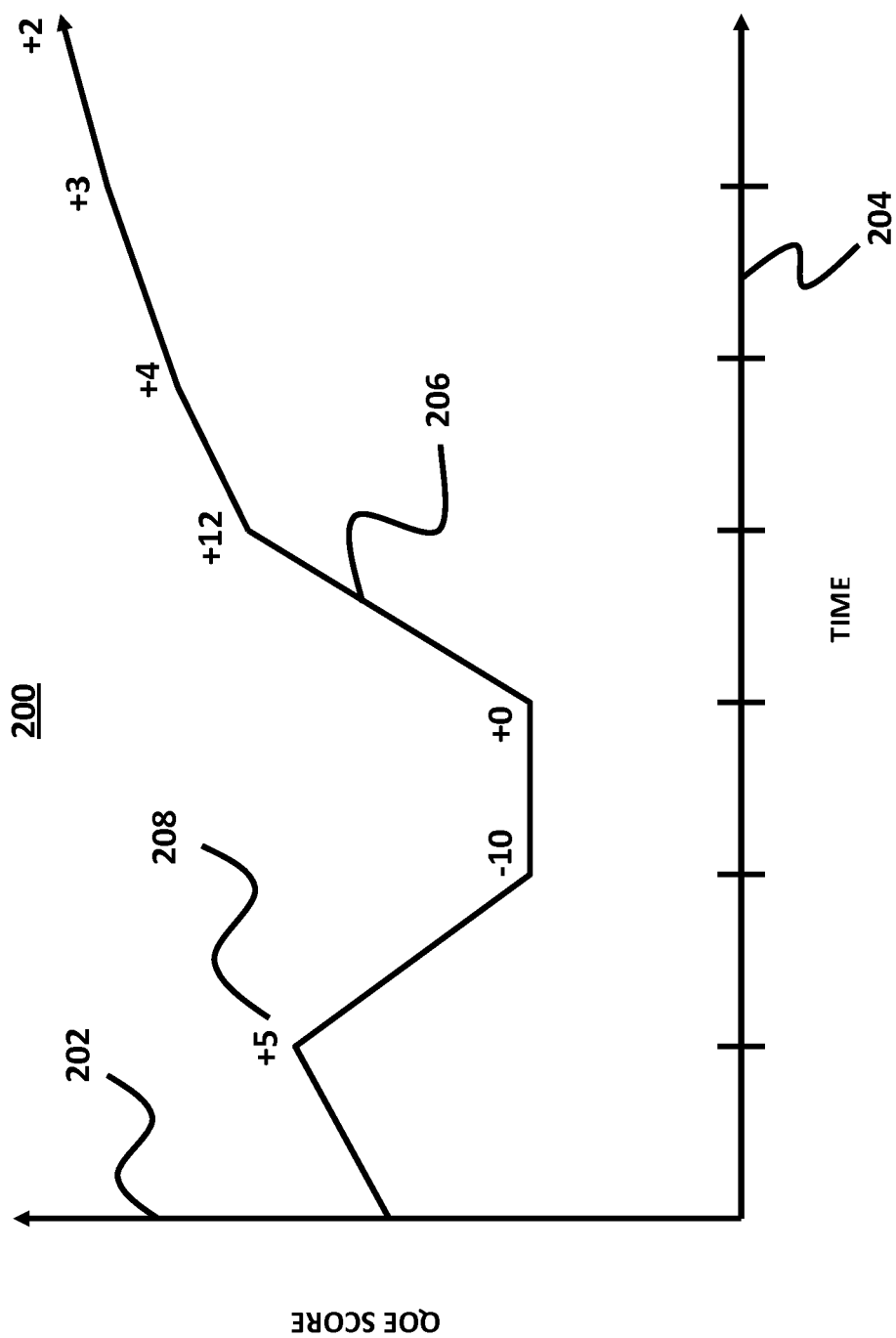
FIG. 2 illustrates a plot of a QoE score changing over time as different events come up during a user activity.

FIG. 2 illustrates a plot of QoE updates 200 over the course of a user activity. The plot of QoE updates can be displayed to a user or a service provider for visual inspection and for potential diagnostics. The y-axis 202 of the plot corresponds to the QoE score, and the x-axis 204 of the plot corresponds to time. The plotted line 206 shows a QoE score at a point in time, with the labels 208 showing the relative change in value of a QoE as time progresses from point to point along the x-axis. For example, the initial QoE score was updated by adding five, to the current QoE score as a result of a quality event. At a later point in time, a second quality event results in the QoE score being reduced in value by 10. The third quality event does not change the QoE score. The fourth quality event increases the QoE score by 12. Each change in the plot shows a different event received, with the event resulting in either an increase or decrease in the QoE score.

Figure 3:
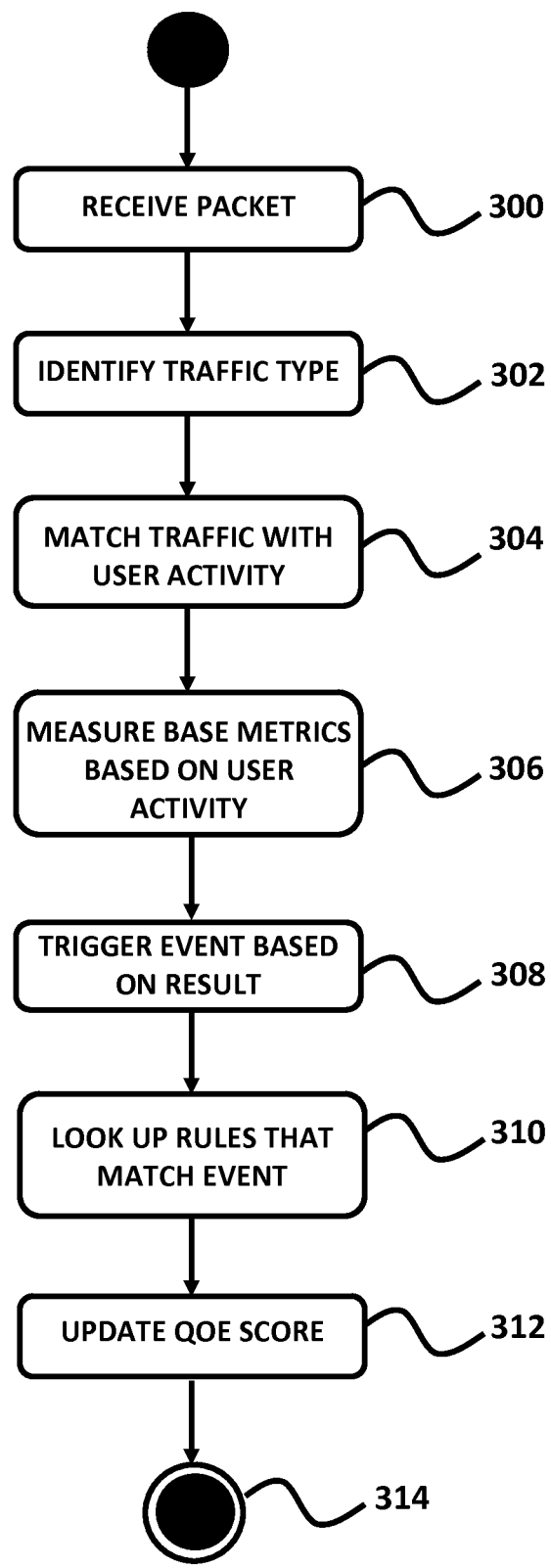
FIG. 3 illustrates an activity diagram with a lower level of detail for the process of updating the QoE score during a user activity by examining traffic packets.

FIG. 3 illustrates an activity diagram that presents the steps involved in analyzing a packet to measure a base metric. Step 300 receives a packet. The packet can be intercepted at the server level, at a proxy level, or at the client level, or at more than one level between the client and the server. Step 302 identifies the traffic type with which the packet is associated. For example, a packet might be identified to be part of the media streaming traffic, or it might be identified as instant messaging traffic. The identification can be done with a packet sniffer or by determining the destination port of the packet. Step 304 conducts the step of matching the traffic type with a specific user activity. An embodiment of the present invention provides where each packet could be exclusively assigned to a single user activity. For example, a packet associated with an online game, where the online game is running inside of the web browser, could be exclusively assigned to the user activity of online gaming. Alternatively, the packet can be assigned to the user activity of online gaming as well as the activity of web browsing. This option would allow for web browsing to provide an overall QoE score for the experience of the user with overall Internet applications.

Step 306 measures the base metrics based on the type of user activity that generated the corresponding traffic. For example, for the user activity of media streaming, dropped packets may be an extremely important aspect of the QoE score, whereas for online gaming, latency might be the most important aspect. The result of the base metrics then triggers an event based on the result from step 308. The event triggered may also save a temporary result to memory or to a local file for future reference. For example, a base metric counting the number of packets lost back to back can retrieve the current number of lost packets from memory or the local file, increase the number by one, and then save the updated count to memory or the file. Step 310 looks up quality event rules that match the raised event. For example, a rule can be that if 10 packets are lost back to back, then 20 is subtracted from the QoE score. Alternatively, if 10 packets are lost back to back at least in two different occasions in the last minute, then the current QoE score is reduced by 30%. Step 312 updates the QoE score by the amount specified in the quality event rule.

When updating the QoE score in step 312, the QoE score can be adjusted based on the relative importance value associated with the user activity. For example, the user may specify the relative importance value or weight for each user activity with a value between 0 and 100. A user that considers web browsing extremely important may assign it a high relative importance value of 90. On the other hand, if the user does not care about VoIP, then the user may assign it a low relative importance value of 50. The QoE score for the web browsing activity can then be updated by multiplying the web browsing QoE score by 0.90 (90 divided by 100). Similarly, the QoE score for the VoIP activity can be updated by multiplying the VoIP QoE score by 0.50 (50 divided by 100). Alternative value weighting and methods for normalizing data can also be used. Value weighting and methods to normalize data are well known in the art.

Figure 4:
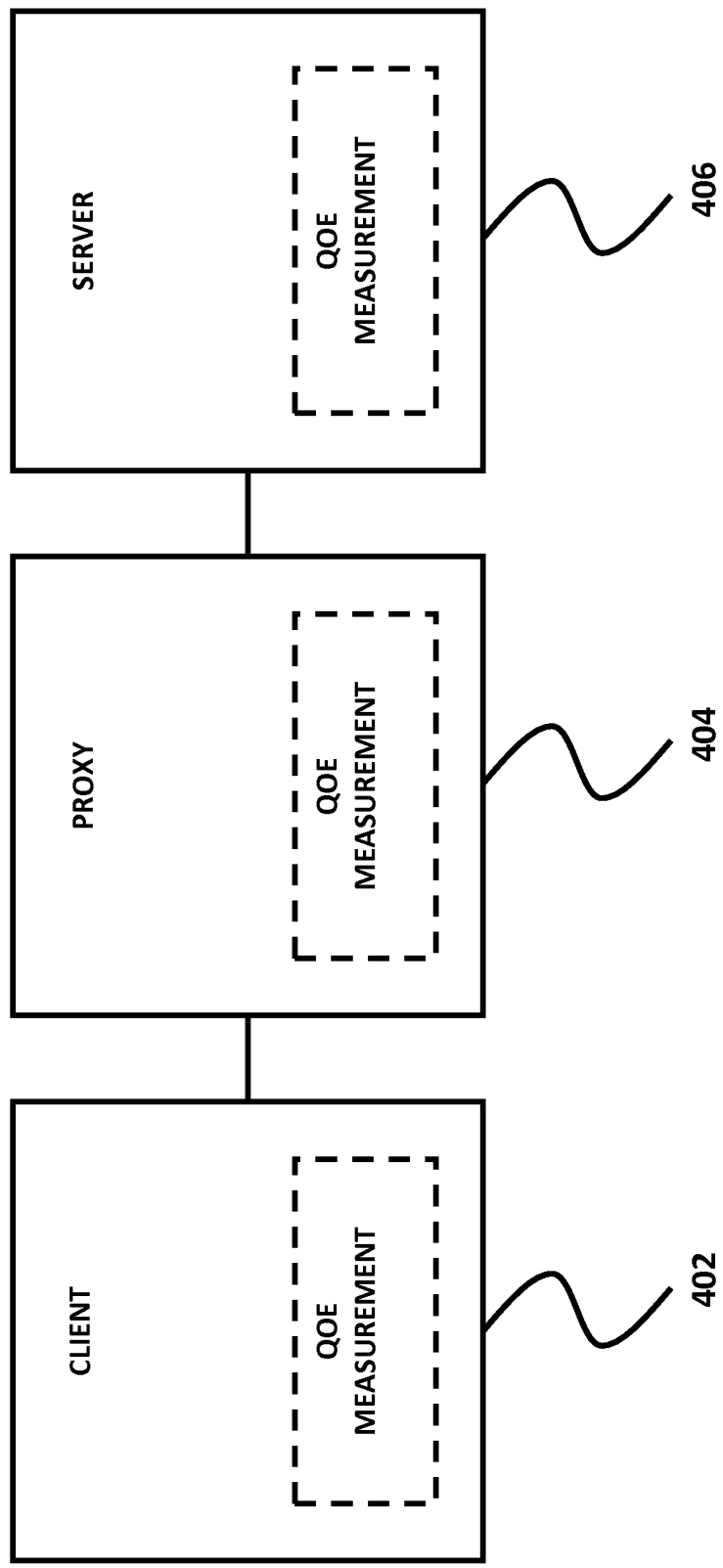
FIG. 4 illustrates the various components at which the QoE measurement can be done completely or partially.

FIG. 4 illustrates the three components at which the QoE measurement can be conducted. The QoE measurements can be performed at the client side 402, at a proxy level 404, or at the server level 406. For example, the QoE measurement can run as a service or daemon, intercepting traffic in order to do the QoE measurement. The QoE measurement can also be done as a web browser plugin, or it can be done automatically by the modem or router used by the user. The QoE measurement can also be done by a proxy server 404. A proxy server is a server that acts as an intermediary for requests from clients to servers. A proxy can pass requests from the server to the client and from the client to the server unmodified, or it can modify the request depending on the type of proxy. Proxies are used for caching requests to a web server (hence improving the performance of a web server), for content filtering, for making web browsing anonymous, and for intercepting traffic for one or more purposes. A proxy can be placed at various points between a user and the destinations servers on the Internet. For example, it can be placed on a user's local computer or on a gateway.

An embodiment of the present invention provides a method where the user can set up a proxy or enable a customized proxy for QoE measurement. For example, the user can set up a proxy server supported by the user's web browser, if the web browser is capable of such a function. The subscriber's router or modem can also act as a proxy server, performing the measurement of QoE metrics for the various user activities. The proxy can also be set up at the service provider side, either on a server or gateway 406.

An embodiment of the invention provides a method for modeling user behavior in IP networks by emulating a set of user activities for different classes of users. User behavior follows a certain profile of activities. For example some users may engage in heavy amounts of peer transfers while not doing any VoIP while others may do the opposite. As a consequence, user behavior while accessing IP networks can be modeled by a set of activities. These activities include, but are not limited to, placing and receiving telephone calls (VoIP and wireless), P2P file transfers, web browsing, media streaming, and online gaming.

The methodology of emulating user behaviors consists of creating behavior profiles for different behavior patterns which belong to different classes of users. Next, the defined behavior profiles are emulated, resulting in realistic emulation of IP network traffic characteristics for testing purposes. Finally, the QoE for the various emulated behavior profiles allow for an assessment of the quality of service being provided to users fitting the classes of users.

User profiles can be created for different behavior patterns which belong to different classes of users. Emulating these behavior patterns can lead to more realistic emulation of IP network traffic characteristics for testing and diagnostic purposes. For example, the behavior profile for a hypothetical file share/download user is shown in the following table:

| User Activity | Application used | Bandwidth consumed | User Quality of Experience Importance |
|---|---|---|---|
| Web surfing | FIREFOX | 30% | 8 |
| Peer to Peer | BITTORRENT | 50% | 5 |
| VoIP | SKYPE | 20% | 10 |

Average Bandwidth Usage: 5 Mbps
Maximum Bandwidth Usage: 10 Mbps

The table is representative of a profile where the most bandwidth is consumed by peer to peer traffic, but the most importance is on VoIP with SKYPE. The QoE is acceptable for a household that has a first subscriber who only places VoIP calls, sends email and browses the web. For a second user who mainly uses the network for transferring files via peer to peer networking the service may not be acceptable. An embodiment of the present invention provides a method where a service provider can test the service with realistic network traffic. An aspect of the present embodiment provides that the network can be tested to determine the QoE of various classes of users.

An embodiment consists of a method of modeling user behavior in an IP network, comprising the steps of allowing a testing user to create a behavior profile specifying one or more user activities from a plurality of user activities performed by a user over the IP network, and one or more bandwidth usage levels corresponding to the one or more user activities; associating one or more applications from a plurality of applications with the one or more user activities; emulating the behavior profile over the IP network by performing the one or more user activities using the one or more applications; and measuring a quality of experience (QoE) score for each user activity from the one or more user activities.

The step of emulating the behavior profile is performed in real-time. The method further comprises the step of allowing the testing user to specify the one or more applications used to perform the one or more user activities, or to specify an operating system used to emulate the one or more applications. The one or more applications can be determined based on the operating system.

The behavior profile further comprises an average, maximum, and minimum bandwidth usage levels for each application from the one or more applications. The behavior profile further comprises one or more from the group consisting of an average bandwidth usage level, a maximum bandwidth usage level, and a minimum bandwidth usage level. The one or more bandwidth usage levels are specified as a percentage, the one or more bandwidth usage levels adding up to no more than 100 percent.

The behavior profile further comprises an application bandwidth usage level for each application from the one or more applications. The one or more bandwidth usage levels fluctuate over a range of bandwidth levels. The range of bandwidth levels can be defined by a probability distribution.

The one or more user activities are selected from the group consisting of web browsing, sending email, receiving email, downloading a first file, uploading a second file, peer to peer file sharing, Voice over Internet Protocol (VoIP), online gaming, media streaming, and secure session.

The behavior profile further comprises a QoE importance level for each user activity from the one or more user activities. The method further comprises the step of adjusting the QoE score of each user activity from the one or more user activities based on the QoE importance level for each user activity from the one or more user activities.

The method further comprises the step of allowing the testing user to define a new user activity for the behavior profile. The testing user can specify a new application associated with the new user activity, a protocol used by the new user activity, or script emulating the traffic associated with the new user activity.

The method further comprises the step of allowing an emulation of the behavior profile to fluctuate by varying a value of a parameter of the behavior profile over a range of values. The parameter is selected from the group consisting of an application used to perform a user activity, an average user activity bandwidth usage level, a maximum user activity bandwidth level, a minimum user activity bandwidth level, an average application bandwidth usage level, a maximum application bandwidth usage level, a minimum application bandwidth usage level, and an operating system used to emulate the behavior profile. The emulation can fluctuate over the range of values equally, randomly, or using a probability distribution.

An application from the one or more applications can be emulated by executing a set of steps similar to the execution of the application. The method further comprises the step of emulating a use of encryption, onion routing, and anonymization by a set of applications from the one or more applications.

The one or more user activities are emulated in parallel according to a set of parallel association rules. The set of parallel association rules can consist of random starting times for the one or more applications, conditional statements, or one or more time events associated with the one or more applications.

The method further comprises the step of emulating a plurality of instances of the behavior profile over the IP network. In addition, the method further comprises the steps of allowing the testing user to create a plurality of behavior profiles; and emulating a plurality of instances of each behavior profile from the plurality of behavior profiles. This further comprises the step of measuring a QoE score for each user activity from the one or more user activities of each instance from the plurality of instances of each behavior profile from the plurality of behavior profiles.

An embodiment of the present invention provides a method where the traffic is emulated in real time, analogous to how a subscriber would behave. For example, an emulated subscriber would make a request for a webpage, receive the webpage, wait a period of time on the current webpage, click on a link on the current webpage, etc. The number of users or subscribers emulated can be varied to test various scenarios. For example, the number of users that represent an average network load could be emulated to test a system under average conditions. Alternatively, the number of users could be increased in order to emulate stress test conditions. The number of users can also be made to fluctuate, as is typical of normal IP network traffic. For example, the emulation can begin with a low number of users, and then steadily increase this, and then steadily decrease the number of users to an average number of users. Alternatively, the number of users can be increased sporadically, dropping the number of users to an average number after a period of time.

The emulation of the user profiles consists of two parts: behavior of applications and behavior of subscribers. The behavior of applications concerns the behavior of applications used by subscribers over IP networks and how these applications affect the IP network performance. For example, an email application would behave differently and place different bandwidth demands on an IP network than a P2P file sharing application such as BITTORRENT. The behavior of subscribers concerns realistic emulation of subscriber actions. For example, flooding of a network by submitting 1000 requests for a webpage is not realistic user behavior. On the other hand, a user pressing the refresh button on a web browser multiple times is realistic user behavior if the current webpage fails to load within an expected amount of time.

The emulation of the behavior of applications includes the emulation of different types of applications used by users. For example, different web browsers have different performances due to the way web connections are handled. The INTERNET EXPLORER browser behaves differently and will open a different number of TCP connections compared to the FIREFOX or the OPERA web browsers. The emulation of applications is not limited to web browsers. The emulation includes dynamic applications such as BITTORRENT and SKYPE, which adapt based on available bandwidth and the number of peers online. In addition, emulation of a subscriber engaging on online gaming would be different in contrast to the emulation of a subscriber visiting social networking sites.

As previously discussed, subscriber or user activities include browsing the web, downloading and uploading a file, streaming media (video or audio), sending an email, placing VoIP calls, playing an online game, instant messaging, file sharing using P2P technologies, and exercising a secure session like VPN or HTTPS. Compound user activities can be emulated by performing various user activities in parallel, which is common user behavior.

Traffic is emulated by having emulated subscribers, with the behavior of each emulated subscriber dictated by a behavior profile. The behavior profile specifies the corresponding applications to use in order to generate the traffic. An embodiment of the present invention provides a method where a set of default profiles would be used for the emulated users. For example, a default Profile1 could consist of 80% web browsing and 20% for VoIP. Another default Profile2 could consist of 50% web browsing, 40% email, and 10% online gaming. Yet another default Profile3 could consist of 60% P2P file sharing, 25% web browsing, and 15% instant messaging. Default profiles can be defined as necessary to cover the various types of user classes.

An embodiment of the present invention provides a method where a set of default behavior profiles are created manually by an ISP or other entity (hereinafter referred to as a "testing user" that tests the performance of a network. The testing user can specify the characteristics of each behavior profile. For example, a behavior profile for a sports fan subscriber, who mostly uses the Internet for watching videos of sporting events, may consist of 60% media streaming, 30% email, and 10% web browsing, with the media streaming expected to consume the most bandwidth. Other characteristics specified for behavior profile include the application or applications used for each user activity, the maximum bandwidth used in total by the behavior profile or the maximum bandwidth used by each user activity, the average bandwidth used in total by the behavior profile or the average bandwidth used by each user activity, and the QoE importance level for each user activity, etc.

When creating each behavior profile, the testing user can specify the type of activities that a subscriber may engage in. For example, a testing user may specify for a sports fan subscriber profile that the activities to be emulated include media streaming, email, and web browsing. An embodiment of the presenting provides a method where the testing user can select the subscriber activities from a predefined list of subscriber activities. For example, the testing user can create the list of activities for a behavior profile by using the mouse to click on each activity, or by dragging each listed activity with the mouse, or by typing the name of each activity.

Another embodiment of the present invention provides a method where the emulation of each activity can be done with a corresponding random application. For example, Profile1 could select a random web browser to perform the web browsing emulation, with the random web browser picked from the group of web browsers including INTERNET EXPLORER, FIREFOX, SAFARI, CHROME, and OPERA. Alternatively, a specific web browser can be specified with the default Profile1, so that Profile1 always uses the INTERNET EXPLORER web browser to emulate the web browsing traffic. In the case of instant messaging, the emulation could be done with AIM, ICHAT, ICQ, PIDGIN, and YAHOO messenger, among others. One of these instant messaging clients could be selected randomly when emulating Profile1. Alternatively, the AIM instant messaging client could always be used with the emulation of Profile1.

Another embodiment of the present invention provides a method where profiles can be subdivided and organized by operating system. During an emulation, the profile for an operating system can use popular applications associated with the operating system. For example, Profile1 could be further divided into WINProfile1, LINProfile1, and MACProfile1. The WINProfile1 profile could emulate traffic under a WINDOWS operating system using the INTERNET EXPLORER or FIREFOX browsers and YAHOO messenger as the instant messaging client. The MACProfile1 profile could emulate traffic under a MAC OS X operating system using the SAFARI browser and ICHAT as the instant messaging client. The LINProfile1 profile could emulate traffic under a LINUX operating system using the FIREFOX or OPERA browsers and PIDGIN as the instant messaging client.

The usage patterns for a behavior profile can be specified by entering a percentage value or some other numeric entry for each user activity included in the behavior profile. For example, the testing user can enter the number "60" for the media streaming activity, the number "30" for the email activity, and the number "10" for the web browsing activity. Alternatively, the testing user could specify the usage patterns by dragging a slider for each user activity, where the position of the slider specifies the relative usage for each activity in a behavior profile.

Another embodiment of the present invention provides a method where the testing user can specify a new subscriber activity not listed in default list of subscriber activities. For example, the testing user may enter a new subscriber activity consisting of anonymous web browsing with the use of The Onion Router, which is a software program developed by the Tor Project, Inc (TOR™). The testing user can enter a title for the new subscriber activity, a number specifying the expected usage relative to the other subscriber activities, and the characteristics of the traffic to be generated for the new subscriber activity for realistic emulation. This can be specified by indicating the protocol to be used for the traffic. For example, it can be specified that the protocol uses a TCP, UDP, or any other protocol. Alternatively, the application that generates the corresponding traffic can be specified. For example, it can be specified that the FIREFOX browser running with a TOR extension will generate the corresponding traffic. The traffic can be further described by providing a script that emulates the generation of the corresponding traffic for the new subscriber activity. For example, the script can contain instructions for emulating web browsing with TOR without running the actual web browser.

The behavior profiles can be created from scratch, a set of default behavior profiles can be used, and the set of default behavior profiles can be edited to create new behavior profiles. In addition to specifying the expected usage for each activity, the expected bandwidth consumption can also be specified. For example, a subscriber may do simple web browsing limited to simple static web pages, whereas a second subscriber may do web browsing of more interactive web pages or visit web pages that make heavy use of technologies such as FLASH and video files. The bandwidth consumption for these two subscribers would be different, even though both subscribers are engaging in the same user activity. The expected bandwidth consumption can be specified using a numeric entry, such as a number between 0 and 100, with a slider, or with an alternative graphical representation.

In an embodiment, the testing user can further specify how emulated bandwidth is expected to vary during emulation. The fluctuation can be specified using one or more bandwidth levels. For example, the testing user may specify a low, a medium, and a high bandwidth level. With each of these bandwidth levels the testing user can specify the corresponding bandwidth consumption. For example, high bandwidth consumption can use about 95% of all available bandwidth, medium bandwidth consumption can use about 50% of all available bandwidth, and low bandwidth consumption can use about 5% of all available bandwidth. The bandwidth consumption at each level can also be specified using a range value, such as about between 10% and 20%, or always greater than about 70%, or always less than about 4%. The amount of time to dedicate to each bandwidth level can also be specified by the testing user, either as a single number or as a number range. For example, the user may want the high bandwidth level to run about 10% of the time, with each of the medium and the low bandwidth levels running about 45% of the time.

As previously discussed, the creation of the behavior profiles consists of first determining a set of classes of users, and secondly defining aspects for each of the classes of user classes. Examples of classes of users include a light household user, who may use the internet in order to access simple web pages and to check email; a file sharer/download user who uses the internet mostly for downloading files via peer to peer file sharing; a home office user, whose activities are centered heavily on email, web browsing, and VoIP to remain connected with customers; an avid gamer, who may use the internet for online gaming and social networking; a business database user, who may need effective responses when interacting with the server hosting the database and efficient file downloads from the database; and a business heavy phone user, who may use VoIP for simple phone conferencing and video conferencing. These classes of users are mere examples of the vast classes of behavior profiles can be created. What distinguishes these classes of users are the profile aspects defined for each class of users.

An embodiment of the present invention provides a method where each behavior profile accounts for variance equally or randomly within a range of values for each parameter. For example, a behavior profile is meant to realistically cover a class of users with certain behavior patterns of activities done over an IP network. However, it is expected that each user within a class of users will exhibit slight differences in behavior from other users in the same class. Allowing the parameters that define a behavior profile to include variance within a reasonable range results in more realistic emulation. The parameters that can account for variance include the expected use of each activity, the corresponding bandwidth consumption, bandwidth consumption according to bandwidth levels, the choice of application used for a user activity, the choice of operating system, etc.

The variance can be defined using a probability distribution. For example, a uniform distribution can be used to allow for the values to fluctuate equally across a number range. The expected use for web browsing in a behavior profile can have a default value of about 60%, but be allowed to vary with a uniform distribution between about 50% and about 70%. In this case, each instance of this behavior profile during emulation would have an equal probability of having a value between about 50% and about 70% for web browsing. Alternatively, a normal distribution (bell curve) can be used, with the default value for the activity in the behavior profile specifying the average of the normal distribution (or center of the bell curve). For example, the INTERNET EXPLORER web browser can be used the most often (center of the bell curve), with other popular browsers, such as FIREFOX and SAFARI, used less often than INTERNET EXPLORER by being positioned slightly to the left or to the right of the center of the bell curve. The tails of the bell curve can be reserved to less popular browsers such as KONQUEROR and LYNX. Other alternative probability distributions can also be used. The use of probability distributions is well known in the art.

Realistic emulation includes emulating the behavior of adaptive applications that rely on peer-to-peer network architectures, such as BITTORRENT and SKYPE. These adaptive applications tend to have viral properties, in that if existing connections from a peer to a set of peers are disconnected or interrupted, the peer can search for and build a new different set of connections to a second set of peers.

Many applications can be emulated without actually running the corresponding program. For example, the steps involved in emulating sending an email, or the steps involved in a browser requesting a webpage from a server, are straightforward, and can be emulated without running a mail client such as OUTLOOK, THUNDERBIRD or a web browser. However, applications such as SKYPE make it difficult for emulation without actually using the SKYPE program. This is due in part to SKYPE using a proprietary closed-source protocol. An embodiment of the present invention provides a method where the testing user can specify a first set of applications to emulate by executing the application and a second set of applications to emulate by executing a set of steps similar to the execution of the application.

The realistic emulation can also emulate the use of encryption techniques for various applications, including email and other types of packets. The emulation can also consist of emulation of users that make use of onion routing, as used by applications such as The Onion Router. In onion routing messages are encrypted and sent through several network nodes, with each network node removing a layer of encryption to uncover further routing instructions, subsequently sending the message to the next router. Emulation of this type can allow a service provider to assess the bandwidth overhead resulting from anonymizing software.

An embodiment of present invention provides a method where several subscriber activities are emulated in parallel. For example, a subscriber is not likely to begin a file download, and suspend the rest of the subscriber activities while waiting for the file download. A typical subscriber is likely to be downloading a file, while at the same time continuing to browse the Internet, while alternatively listening to streaming audio or video playing in the background, or chatting with a second subscriber with an instant messaging client. It is important to emulate such parallel behavior, since parallel behavior reflects typical bandwidth load and consumption expected from real users.

An embodiment of the present invention provides a method where a default set of concurrent activities can be predetermined. For example, it can be specified that the web browsing activity should always be active at the same time as the instant messaging activity, and the media streaming activity should always be active in parallel with the file downloading activity. These parallel association rules can be customized by the testing user. The testing user can also customize a set of parallel association rules that apply to all behavior profiles. Alternatively, each behavior profile may be customized by specifying corresponding parallel association rules. For example, the behavior profile for a teenage subscriber, may consist of emulating in parallel web browsing, media streaming, instant messaging, and P2P file sharing. In contrast, the behavior profile for an adult subscriber may consist of emulating in parallel media streaming and web browsing.

An embodiment of the present invention provides a method where user activities run in parallel, but the corresponding user activities are started at random times. For example, a behavior profile may be emulating web browsing, and after a period of time, the instant messaging user activity may be started. Another embodiment of the present invention provides a method where a set of rules specifies how activities are run in parallel based on one or more time events. An example rule can be where web browsing is emulated for five minutes followed by emulating instant messaging. Another rule can specify where a file download is emulated for three minutes followed by emulating media streaming. There are many ways in which rules can be defined and combined to create new rules. An embodiment of the present invention provides a method where the testing user can define the set of parallel rules that specify how activities are to run in parallel. The set of parallel rules can be specified using conditional statements.

The behavior profile can also specify the type of hardware to emulate for a subscriber. For example, a behavior profile may emulate the corresponding subscriber activities over a modem connection; a second behavior profile may emulate at a speed of 1 megabit per second (Mbps), whereas a third behavior profile may emulate at a speed of 10 Mbps. Alternatively, one or more behavior profiles can be emulated using one speed. Yet another embodiment of the present invention provides a method where the connection speed used to emulate a behavior profile is picked at random. A probability distribution can also be used to determine the range of connection speeds to emulate for behavior profiles. For example, the connection speeds to test may be picked based on a normal distribution. This would result in the most common connection speeds being tested the most, such as 1 Mbps, with less than average and above average connections tested less often. For example, connections of 7 kilobits per second (Kbps) and up to 1 gigabit per second (Gbps) would be tested less. A different probability distribution, such as one that skews to the left or to the right, can allow for testing of extreme cases, such as emulation at overall high speed connections or at overall low speed connections.

An embodiment of the present invention provides a method that emulates deep packet inspection (DPI), which can be done to identify whether the packet contains illegal material. For example, gateways and other service provider hardware can analyze packets to determine the legality of its contents. A packet signature can be searched in a database containing entries of packet signatures to determine whether the contents are legal or illegal. Emulation of this checking process is done because the incurred overhead is important for a realistic network simulation. An embodiment of the present invention provides a method where generated packets during emulation can be tagged with a first signature to identify the packet as containing legal contents, and other packets can be tagged with a second signature, identifying the packet as containing illegal contents. For example, a signature of "123456" can be used to identify a legal packet, whereas a signature of "ABCDEF" can be used to identify an illegal packet. Numerous signatures can be created according to a pattern, or they can be created randomly to simulate the packet analysis and database matching conducted in real networks.

An embodiment of the present invention provides a method where a behavior profile further specifies the relative expertise of the subscriber. The subscriber expertise identifiers include expert, intermediate, and novice. However, alternative expertise identifiers can be used. The testing user can further specify a custom subscriber expertise, such as expert on instant messaging and web browsing, but a novice on VoIP calling and P2P file sharing. Behavior profiles with a higher expertise level may be more likely to run several applications in parallel, and to perform the subscriber activities at a faster rate than a novice subscriber with a lower expertise level. For instance, an expert user is more likely to browse web pages at a faster rate than a novice user.

The expertise level can be used to determine an emulation speed of the user activities in a behavior profile. The experience level can also be used to assign the likelihood of running more than one user activity in parallel. The subscriber expertise can be specified in the behavior profile, or a subscriber expertise can be assigned to a group of behavior profiles.

An embodiment of the present invention provides a method where a QoE can be computed for the various user activities in a behavior profile. The QoE scores for all activities in a behavior profile can be averaged or otherwise statistically combined, as discussed previously to provide an overall QoE for a behavior profile. For example, a testing user may find that the QoE for VoIP is low in the behavior profile used for the file sharer/download user class. Alternatively, the testing user may find that a subscriber activity performs poorly across all behavior profiles. For example, emulated subscribers may exhibit low QoE scores for media streaming and online gaming. The QoE for each subscriber activity can further allow the testing user to determine the factors which might be causing the low QoE scores. For example, the low QoE scores in media streaming and online gaming may be due to too many dropped packets and corrupt packets. The QoE scores and the associated diagnostic may help in identifying that the reason for low QoE scores across all behavior profiles for web browsing is due HTTP response requests taking longer than the expected or predicted times. The measuring of QoE for user activities emulated with behavior profiles provides ISPs and testing users with the ability to test the performance of their networks and their ability to provide quality service to users. In addition, this can allow ISPs to test tiered service plans and to customize the performance of packages offered to a class of users.

One important aspect of the behavior profile is the relative importance of each user activity within the profile. This relative importance (where a certain weight is assigned to each user activity), together with the QoE score for each subscriber activity, is used to calculate an overall QoE score for the user. This calculation can be done in multiple ways. It can be a simple multiplication of activity weight and activity QoE, and then normalization of the result. Or it can also involve characteristics from the tiered service plan provided by the ISP. It can also take into account that QoE for certain user activities may be more important than others, like VoIP calls or media streaming could be more sensitive to lower QoE's compared to web browsing.

An embodiment of the present invention provides a method where a priority can be assigned to behavior profiles. For example, a high priority may be assigned to a first behavior profile and to a second behavior profile, while a low priority may be assigned to a third behavior profile. The emulation may then focus on trying to optimize the QoE scores of the high priority profiles. The first behavior profile may be associated with the mother of a family, the second behavior profile may be associated with the father of the family, and the third behavior profile may be associated with the children of the family. The high priority profiles can be associated with subscribers expected to be responsible for paying the bill in a household for the received service, or with subscribers enrolled in more expensive service plans.

An embodiment of the present invention provides a method for synchronization of different components of a computer network system using meta-commands embedded in normal network packets. The data communication channel between different components of a computer network system can be used to transport meta-commands piggybacked in normal network packets, without modifying or compromising the validity of the protocol message.

Another embodiment of the present invention provides a method where test synchronization and control commands are embedded into the network packets sent through a device or system under test. An aspect of the present embodiment is where the device or system under test would be an edge device, with the data communication channel carrying normal packets containing meta-commands embedded in the packets to synchronize the test control of the test clients and the test servers connected to the edge device. The test application sending a request (hereinafter referred to as a "client" or "controller") embeds extra information into the request packets about how this request needs to be handled by the receiving test application (hereinafter referred to as a "server" or "responder"). The way of embedding control information is specific to the network protocols used in the test. The limiting factor is that embedding of control commands can not violate rules of the network protocols used to transport these control commands, such as the resulting request message still being a valid protocol message.

An embodiment consists of a method of embedding meta data in a request sent from a first component to a second component of a computer network system, comprising the steps of encoding the meta data in one or more fields in the request, the one or more fields available according to a protocol and specifying a control information and a data information, the meta data overriding one or more values of the one or more fields used by the protocol to send the request from the first component to the second component, and wherein the encoding of the meta data does not violate a validity of the request according to the protocol and does not corrupt the data information; sending the request from the first component to the second component using the protocol; decoding the meta data from the one or more fields in the request; and taking an action on the second component according to the meta data, the action being independent of the data information contained in the request.

An alternative embodiment consists of a method of embedding meta data in a request sent from a first component to a second component of a computer network system, comprising the steps of encoding the meta data in one or more fields in the request, the one or more fields available according to a protocol and specifying a control information and a data information, the meta data overriding one or more values of the one or more fields used by the protocol to send the request from the first component to the second component, and wherein the encoding of the meta data does not violate a validity of the request according to the protocol and does not corrupt the data information; and sending the request from the first component to the second component using the protocol.

An alternative method consists of decoding meta data embedded in a request received by a component of computer network system, comprising the steps of decoding the meta data from one or more fields in the request, the one or more fields available according to a protocol and specifying a control information and a data information enabling the request to be received by the component, the meta data overriding one or more values of the one or more fields used by the protocol to route the request from a sending entity to the component, and wherein the encoding of the meta data does not violate a validity of the request according to the protocol and does not corrupt the data information; and allowing the component to take an action according to the meta data, the action being independent of the data information contained in the request.

An alternative embodiment consists of a method of synchronizing a first component and a second component of a computer network system, comprising the steps of assigning a control sequence to the first component; encoding a first instruction from the control sequence into one or more fields in a request to be sent from the first component to the second component, the one or more fields available according to a protocol and specifying a control information and a data information, the meta data overriding one or more values of the one or more fields used by the protocol to send the request from the first component to the second component, and wherein the encoding of the meta data does not violate a validity of the request according to the protocol and does not corrupt the data information; sending the request from the first component to the second component; receiving the request with the second component; decoding the first instruction from the one or more fields in the request; and responding to the request with the second component with a response according to the first instruction.

In the present method, the request sent from the first component to the second component passes through a device under test (DUT), which can be an edge device. The first component is a client, the second component is a server, and the request sent from the first component to the second component passes through the DUT. The control sequence synchronizes a behavior of the first component and the second component. The first component and the second component can be housed in a single hardware device. Alternatively, the first component can be housed in a first hardware device and the second component can be housed in a second hardware device. The control sequence can specify test control information for emulating a behavior profile.

For the presented methods, the one or more fields can be one or more custom message elements from the protocol. Example protocols include HTTP, HTTPS, SIP, TRSP, and MGCP.

In an alternative embodiment the one or more fields can be one or more string message elements from the protocol. Example protocols include FTP and TFTP. The meta data can be enclosed within a predetermined sequence of one or more characters.

In yet another embodiment the one or more fields are one or more numeric message elements from the protocol. Example protocols include MGCP, DNS, and RTP. The one or more numeric message elements consist of floating point elements, integer elements, and binary elements.

Figure 5:
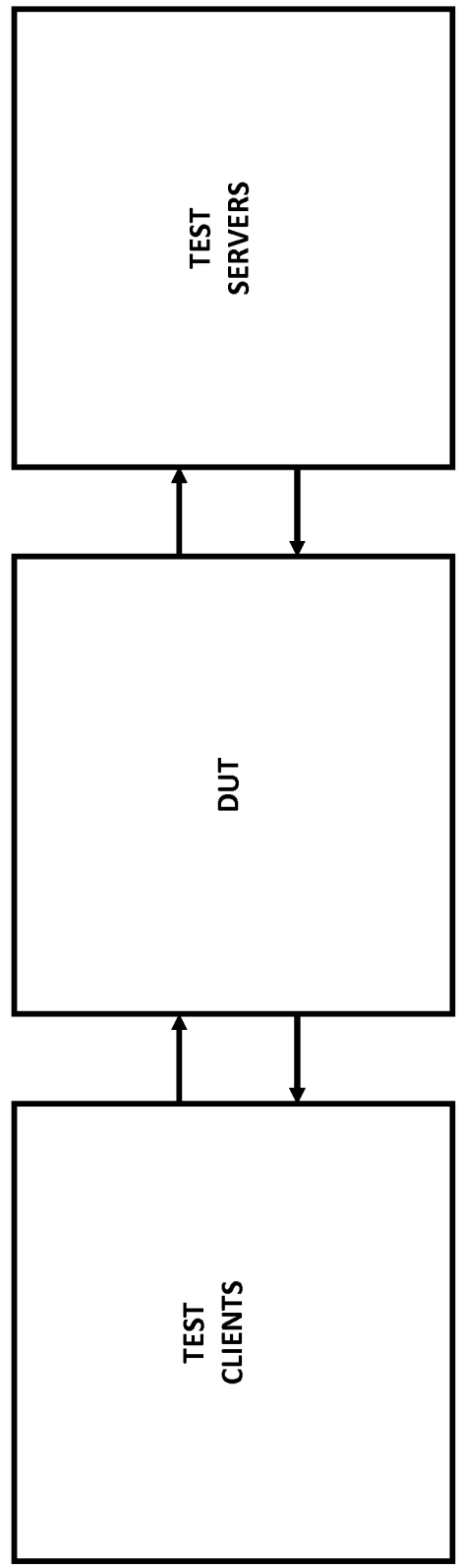
FIG. 5 illustrates an embodiment of responder and controller test devices that are physically different devices.
Figure 6:
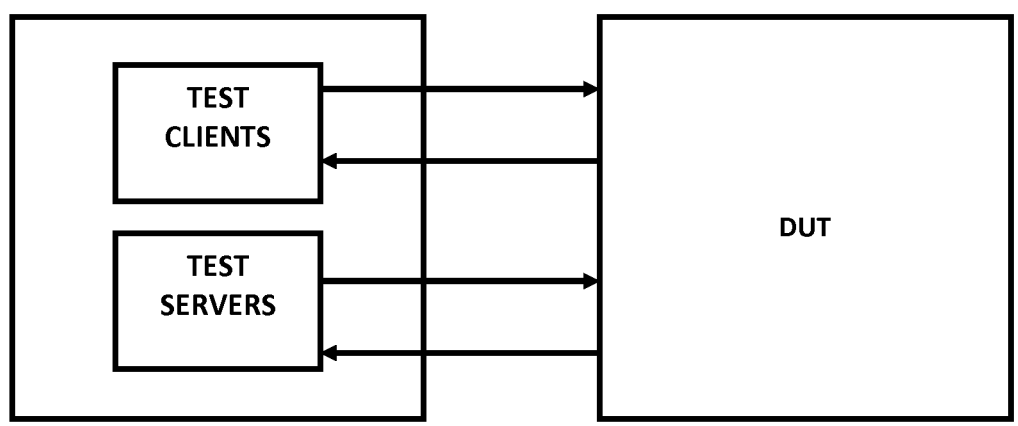
FIG. 6 illustrates an embodiment of responder and controller test devices within a single test device.

The embedding of meta-command in normal packets for synchronizing test control information between network components has the advantage of scalability. The responder and the controller test devices can be physically different devices as illustrated in FIG. 5, versus containing the responder and the controller test devices within a single test device as illustrated in FIG. 6. This increases the overall test computation capacity. In addition, depending on the difference in computational requirements of the controller and the responder sides, different controllers and responder connections can be used, such as one-to-one, one-to-many, and many-to-one. Another advantage is that a configuration of testing is simplified, as most of the test scenario configurations can be done at the controller side.

The proposed piggybacking method of meta-commands in normal network packets also removes the need for a third application or entity which controls the test behavior of the controller and the responder, or the need for opening additional communication channels to allow for the synchronization between the controller and the responder. Instead, all of the control and testing information can be embedded in a normal packet and transmitted via the data communication channel through which normal traffic packets are communicated. Because all of the test control information can be carried along with the data, there are no issues of synchronization between controller and responder. In addition, the control and test information need only be communicated to a single entity, the controller, instead of communicating the control and test information to both the controller and the responder. No new connection or session needs to be created, and no external communication means are used.

For example, in a session initiation protocol (SIP) border controller tester, control commands can be encoded either in SIP extension headers or in custom parameters of standard headers. Commands in INVITE request can indicate how a call needs to be handled, such as accept it, reject it, redirect it, etc.

Different methods can be used to put control meta information into protocol messages. One method uses custom message elements for meta information. Some application protocols provide for extension by means of adding custom message elements. Example known protocols include HTTP, HTTPS, SIP, RTSP, DNS, FTP, TFTP, Megaco, Skinny, BIT-TORRENT, H.323, Telnet, SNMP, SMTP, POP3, IMAP4, NFS, CIFS, RTP, RTCP, SRTP, NTP, and MGCP, among others. In many cases, the device under test does not need to understand these elements, and consequently allows the packets to pass without introducing any modifications.

FIG. 7 illustrates three examples of an HTTP request made with a control command encoded in the normal request. The first HTTP request 700 contains a custom message element which has been modified to include test control information in the HTTP referrer header 702. The referrer header contains the URL of the previous webpage from which a link was followed. The referrer header 702 has been modified by appending the sequence 704 "/return/15/mbs/". In the present illustration, the 704 sequence represents a command informing the responder to return the HTTP request to a download speed of 15 Mbs. An alternative command or syntax can be used. For example, the sequence 704 could have been structured as "/return15 mbs/", "/15/mbs/", "/begin/15/mbs/end/", or "/command/15/mbs/". The key is to have a set syntax structure for specifying control commands in the network packets. For example, the responder can automatically discard all of the text in the referrer header up to a keyword or syntax tag. From the examples above, the keyword could have been "return", "begin", or "command". The syntax structure for the control commands can also dictate how to separate arguments in a command. For example, different arguments can be separated by the forward slash symbol "/" or by using a symbol such as the ampersand "&". Several control commands can be embedded in a single HTTP header. For example, sequence 704 could have been "/return/15/mbs/256/kb/", signifying returning the HTTP request to the controller with a speed of 15 Mbs with a total bandwidth of size 256 Kb.

The second HTTP request 706 shows an example of where the Etag HTTP header has been modified to include the test control information "request timeout" 708. The Etag header is used to determine change in content at a given URL. The test control information "request timeout" 708 could inform the responder to return an HTTP error for a request timeout. Other alternative commands that can be included in the Etag HTTP header are "drop packet", or "drop.packet" depending on the test control syntax, "bad request", "not found", "forbidden", etc., where all of these commands can be used by the responder to determine how to respond accordingly to the controller.

The third HTTP request 710 shows an example of a request where the cookie HTTP header has been modified to include a meta-command 712. In the HTTP request 710 the meta-command 712 instructs the responder to drop the packet. The exact syntax used and the actual commands used can vary accordingly. Programming a set of commands using a set of keywords or tags according to a syntax, and reading and parsing the corresponding created commands with the given syntax, is well known in the art.

Usually message elements consist of an identifier and data associated with the identifier. In many cases, data contents should follow some basic rules, but aside from this, the data contents are arbitrary. Some of the basic rules include excluding control characters, escaping a certain character, etc. Thus, the test application can use these elements to pass almost any control meta information. For example, in the SIP protocol, an SIP message format can be extended by adding new message headers. The SIP message format can also be extended by adding new parameters to standard message headers.

Figure 8:
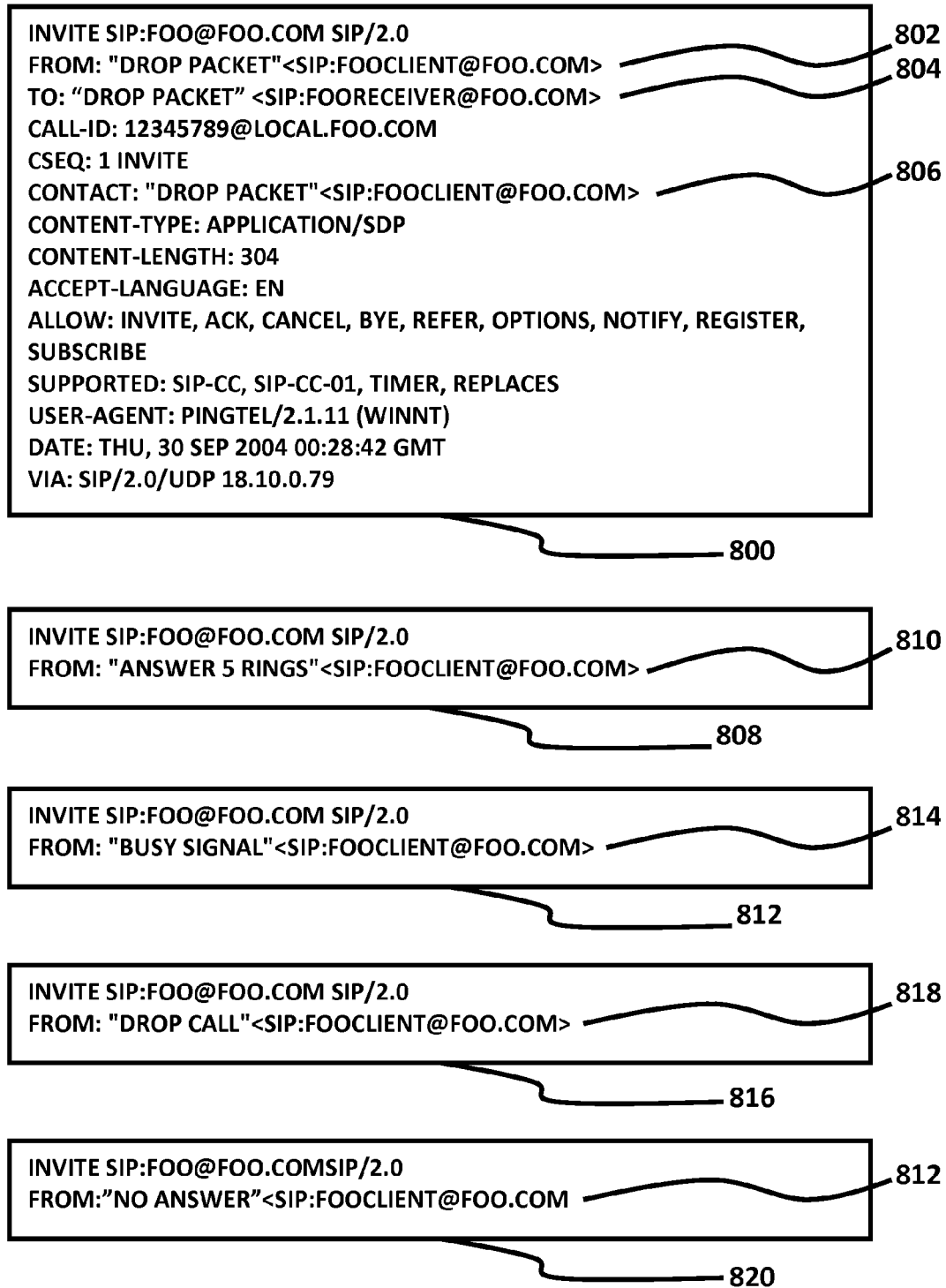
FIG. 8 illustrates examples of SIP INVITE requests with meta information embedded in standard parameters of the SIP INVITE message headers.

FIG. 8 shows several SIP INVITE requests with meta information included by modifying the parameters of the message header. SIP INVITE request 800 shows three possible parameters that can be modified without validating the integrity of the INVITE request. These fields are the string for the "From" parameter 802, the string for the "To" parameter 804, and the string for the "Contact" parameter 806. While the SIP INVITE request 800 shows the meta-command embedded in the three fields 802, 804, and 806, other fields can be modified to embed meta information. The information in SIP INVITE request 800 includes the test control informing the responder to drop the packet. SIP INVITE requests 808, 812, 816, and 820 show other examples of commands embedded in the "From" field of the INVITE request. The command 810 informs the responder to answer the VoIP call after five rings, the command 814 informs the responder to respond with a busy signal, the command 818 informs the responder to drop the call, and command 822 informs the responder to respond with a no answer.

A second method uses string message elements for meta information. Some application protocols, such as FTP or TFTP, have some standard message elements that may contain variable length arbitrary contents. In real applications, these elements are used to pass important information, such as a file name or a user name, but in a testing environment, they may also be used to deliver control meta data. For example, on the FTP protocol, the "RETR" and the "STOR" commands accept a file name as a parameter. This parameter has a meaning in real-life file transfer, but may be used freely in a testing environment to encode different file transfer attributes, including file size, transfer speed, etc. A request can be made for a file with a transfer speed of 100 kilobits per second (kbs) or with a transfer speed of 20 kbs. Alternatively, a request can be made for a file of size 100 kilobytes (KB) or a file of size 150 megabytes (MB). This enables for testing and emulation of different types of environments. Most importantly, the server does not have to synchronize the various testing scenarios. For example, the server does not have to make sure that 30% of requests are made with transfer speeds of less than 100 kbs, an additional 30% of requests made with files greater than 30 mb, and the other 40% requests with transfer speeds greater than 250 kbs and files with random file sizes. Instead, the synchronization is done at the client side. A client can make a specific request in order to emulate or test how the server handles the request. The server can respond accordingly, by simply looking at the meta-commands.

Figure 9:
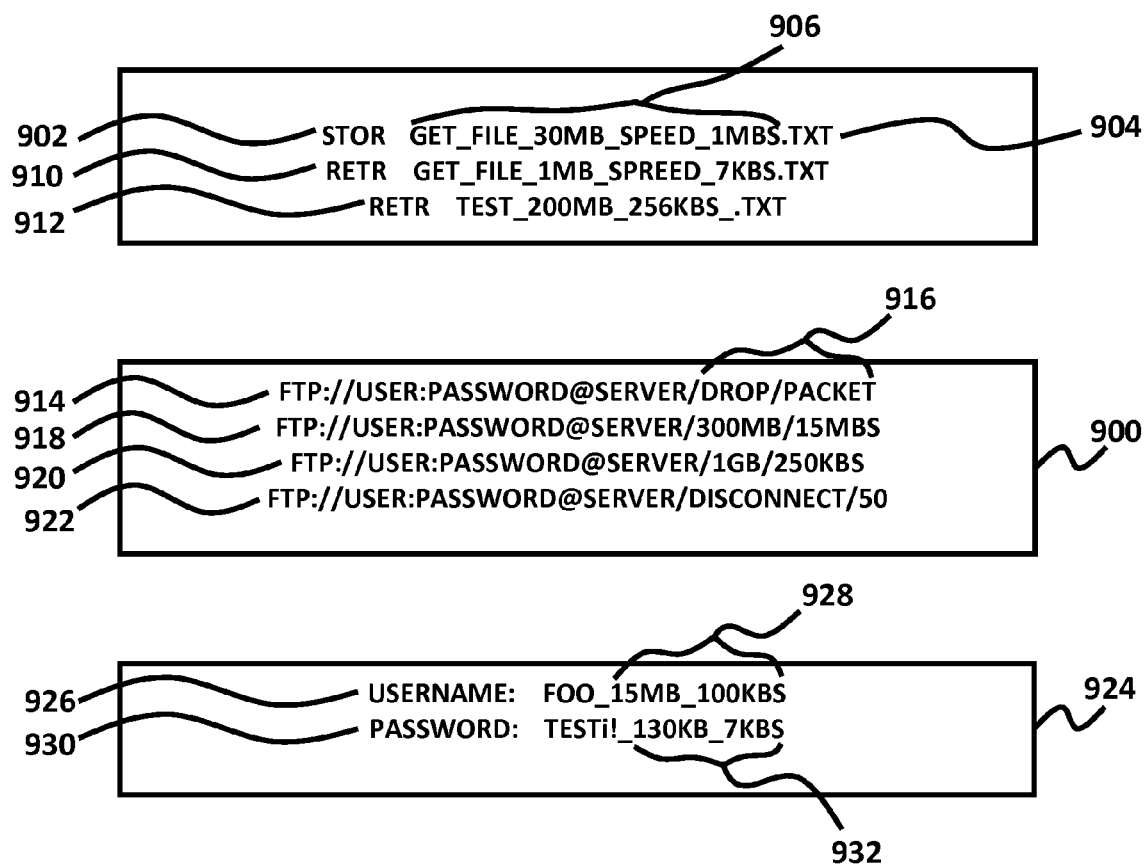
FIG. 9 illustrates examples of FTP commands with meta information embedded in the parameters accepted by the RETR and the STOR commands.

FIG. 9 shows example FTP commands that make use of the parameters accepted to embed meta information. The command 902 shows a STOR command with the meta information embedded in the filename 904. The part of the filename containing the meta information is the string 906. The filename extension ".txt" is used for illustration purposes, but any other filename extension could have been used as well. Alternatively, the filename extension can be excluded as well. The meta information 906 could represent having the responder send a file to the controller of size 30 MB at a download speed of 1 Mbs. The commands 910 and 912 show examples of using the RETR command in FTP, with the corresponding filename parameter encoding meta information. The meta information contained in 910 could represent having the responder send a file of size 1 MB at a download speed of 7 Kbs, while the meta information contained in 912 could represent having the responder send a file to the controller of size 200 MB at a download speed of 256 Kbs. The meaning of RETR and the STOR commands is not relevant, what is important is that the use of these commands allow for arbitrary sized string parameters, in which meta information can be encoded. An edge device is not likely to treat a packet differently based on the filename passed as the argument, since a filename is the most likely item to be non-descriptive in malicious uses.

The FTP commands 914, 918, 920, and 922, show examples of other FTP commands which automatically login to an FTP server, where the meta information is embedded in the FTP server URL path 916. The FTP command 914 contains meta information to drop a packet, with the URL path 916 containing the meta information used by the responder. The FTP command 918 meta information can represent returning a file of size 300 MB at a download speed of 15 Mbs; the meta information in 920 can represent returning a file of size 1 GB at a download speed of 250 Kbs; and the meta information in 922 can represent returning a random file and interrupting the download after having transmitted 50% of the file.

Another example of encoding meta information in string fields can be done by encoding information in fields such as a password or a username used as login information. For example, if authentication was required by providing a username and password, 924. Either the username field 926 or the password field 930 could be encoded with meta-commands. The responder could be instructed to identify anything after the first underscore symbol "_", or after the first alternative symbol, as a meta-command. The meta information in the username 924 is encoded at the end of the actual username value 928. Alternatively, the entire username 924 could encode the meta information. In a real application changing the username to another value would not be practical or realistic, but in a testing environment, setting the username to encode meta information would be viable. The password field 930 also contains example meta-information 932 appended to the actual password value. The password can also be set to contain only the meta-information instead of appending it to the actual password value.

A third method uses numeric message elements for meta information. Some protocols require the use of random values for transaction, message, or some other identifiers. In real life applications these identifiers needs to be as random as possible for security reasons. However, in a test environment, these values may not be completely random. For example, only the 16 most significant bits of a 32-bit value may be random and the 16 least significant bits may be used to carry some control meta information. The amount of information passed by this method is more limited compared to the previous two methods. For example, an RTP message may have up to 15 32-bit contributing source (CSRC) fields. In addition, a DNS message has a 16-bit message identifier. However, the information can also be encoded in binary. For example, if 16 bits are available, then five bits can be used to encode one of 32 possible commands, whereas the other 11 bits can be used to encode the corresponding argument or arguments. The 16 bits can encode 65,536 possible unique commands ($2^{16}$ is equal to 65,536). For example, a bit string consisting of all zeros can represent the command to drop a packet. A bit string consisting of a single one on the left most position can represent returning a request with a speed of 1 Mbs, while a bit string consisting of a single one on the second to last left most position can represent returning a request with a speed of 15 Mbs.

In DNS, the 16-bit field identifies a specific DNS transaction. The transaction ID is created by the message originator and is copied by the responder into its response message. Using the transaction ID, the DNS client can match responses to its requests. Ideally this number would be random for security reasons, however, it can be used to piggyback test control information from the client to the server.

Figure 10:
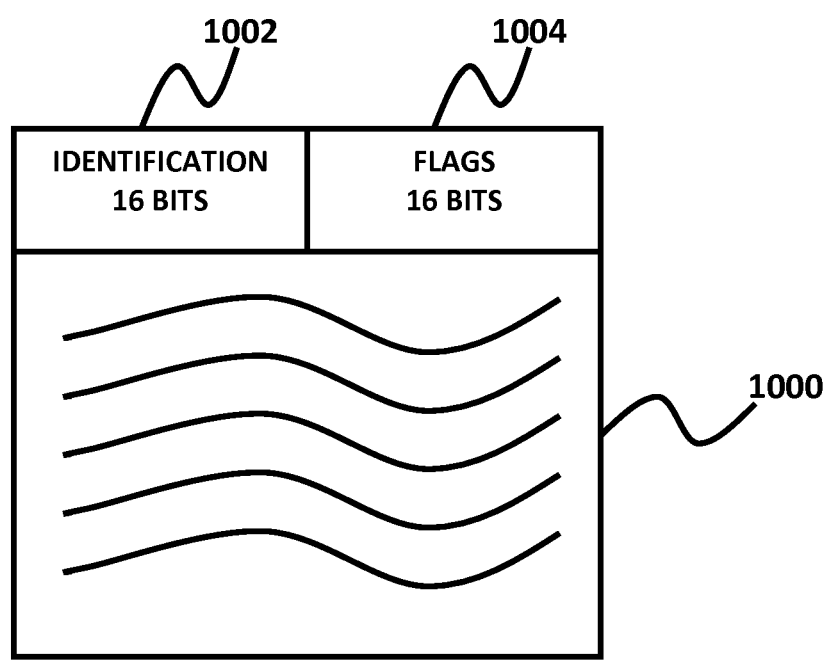
FIG. 10 illustrates the first 32 bits of a DNS packet.
Figure 11:
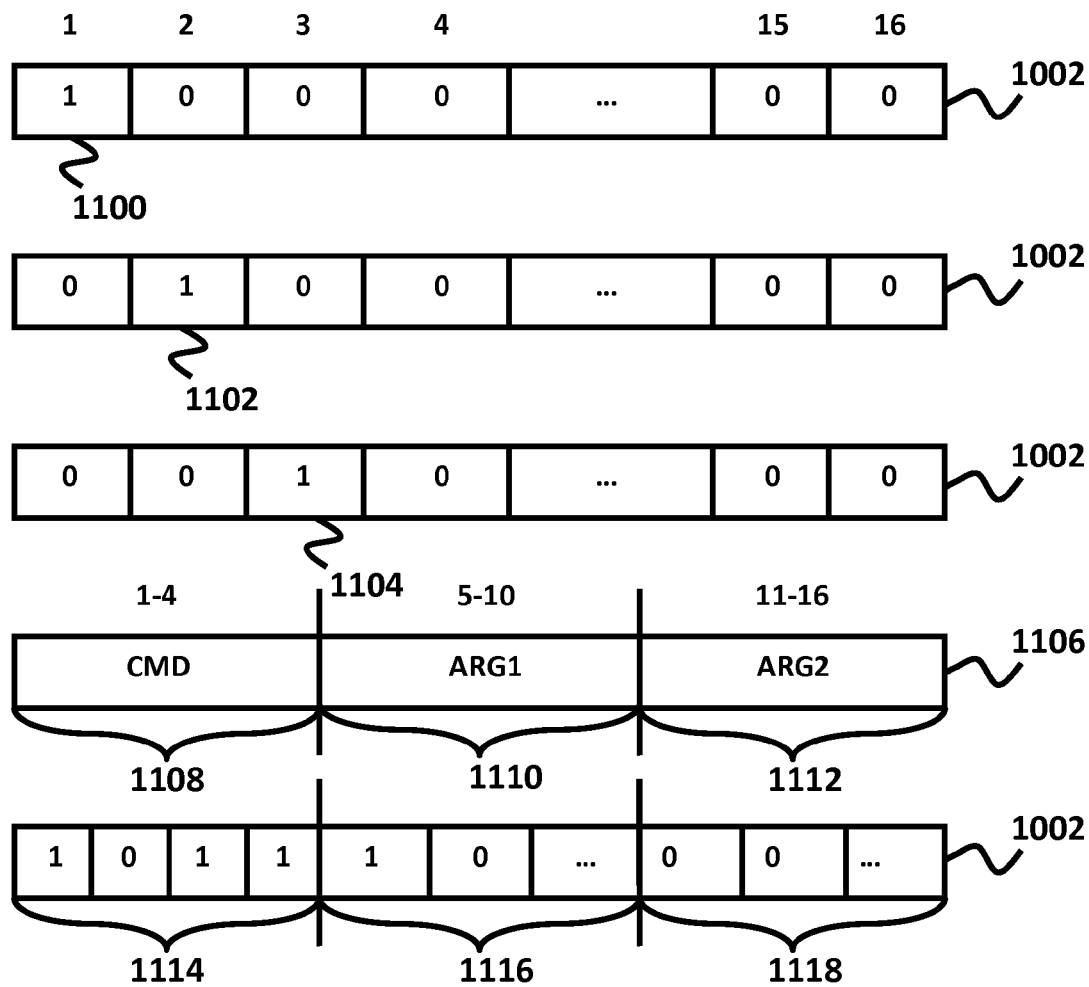
FIG. 11 illustrates meta information embedded in the transaction ID of a DNS packet.

FIG. 10 illustrates the first 32 bits of a DNS packet 1000. The first 16 bits are the transaction ID 1002, while the next 16 bits 1004 classify the message according to a series of flags. FIG. 11 illustrates meta-commands embedded in the transaction ID 1002 by encoding various commands in binary. For example, three instances of the transaction ID 1002 are depicted; the first instance 1002A contains a 1 on the first bit position 1100, here the corresponding command issued by the responder is to drop the packet; the second instance 1002B contains a 1 on the second bit position 1102, here the corresponding command can be for retrieving a file at a download speed of 15 Mbs; and a third instance 1002C contains a 1 on the third bit position 1104, where corresponding command can be for retrieving a file at a download speed of 1 Mbs. Further examples are where the transaction ID 1002 consisting of all ones except for the second to last position can represent answering a VoIP call after three rings, while a zero on the last bit position can represent responding with a busy signal after 3 rings. The arrangement of bits to commands can be mapped in various ways. The encoding of information, either string or numeric, into binary strings is well known in the art.

The DNS transaction ID 1002 can also be subdivided into sections, 1106. For example, the first four bits 1108 of the transaction ID 1002 can represent a test control command. Using four bits allows for 16 possible commands ($2^4$=16). The next six bits 1110 can represent the first argument, one of 64 possibilities ($2^6$=64), and the following six bits 1112 can represent the second argument, one of 64 possibilities. The transaction ID can be segmented as necessary depending on the number of commands needed and the foreseen size of arguments. For example using a fourth instance of DNS transaction ID 1002 (1002d), the test control command 1114 could consist of 6 bits, the first argument 1116 consist of 5 bits, and the second argument 1118 consist of 5 bits. Alternatively, the transaction ID can have been divided into one command and three arguments, with the command consisting of four bits and each of the three arguments consisting of four bits.

Figure 12:
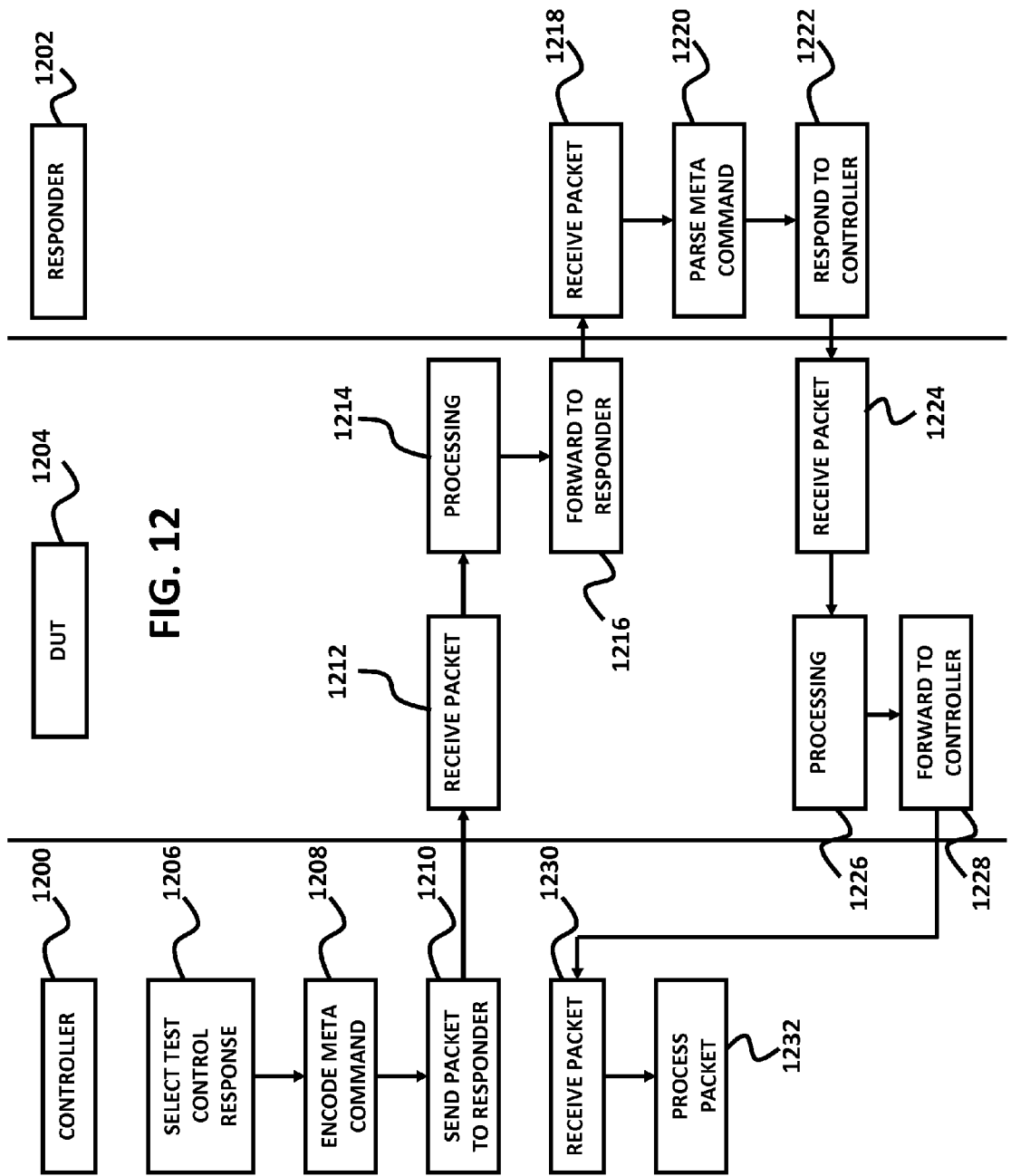
FIG. 12 illustrates a diagram of communication between a controller and a responder, with the communication traffic passing through a device under test.

FIG. 12 illustrates the communication between a controller 1200 and a responder 1202, with the communication traffic passing through a device under test (DUT) 1204. The controller first determines the test control information to be passed to the responder based on the controller's configuration, step 1206. An embodiment of the present invention provides a method where the controller would emulate realistic user behavior by following a behavior profile. The test control or meta information is encoded in a normal packet to be sent to the responder, step 1208. The protocol of the packet would depend on the actions being performed by the controller. In the case of the controller following a behavior profile, the current user activity or activities being emulated by the behavior profile would determine the protocol and the information contained in the packet. After the meta information has been encoded in the normal protocol packet, the packet is sent to the responder, step 1210. The DUT receives the packet, step 1212, and depending on the type of device being tested, it can alter or do some processing on the packet sent by the controller, step 1214. The packet is then forwarded to the responder in step 1216. The packet is received by the responder, step 1218. The responder parses the packet to extract any meta information contained within the packet, step 1220. The responder sends a response to the controller based on the packet protocol, the packet data, and the extracted meta information, step 1222. The DUT receives the packet, step 1224. The DUT can do processing on the packet received, depending on the type of the device and the packet protocol, step 1226, and the packet is sent to the controller, step 1228. The packet is received by the controller in step 1230, and the packet is processed in step 1232.

An embodiment of the present invention provides a method where the embedded meta-commands in normal network packets are used for synchronizing test control information between one or more controllers and one or more responders, with the data communication passing through an edge device under test. The controllers would emulate realistic subscriber behavior according to a set of usage patterns dictated by a behavior profile as previously disclosed herein. Subscriber activities includes but are not limited to browsing the web, downloading a file, streaming media (video or audio), sending an email, placing VoIP calls, playing an online game, instant messaging, file sharing using peer-to-peer technologies, and exercising secure session like VPN/HTTPS. An aspect of the present embodiment is where a new subscriber activity can be further defined by a testing user.

Traffic can be emulated by having emulated subscribers, where the behavior of each emulated subscriber is dictated by one of many behavior profiles, with the behavior profile also specifying the corresponding applications to use in order to generate the traffic. An embodiment of the present invention provides a method where a set of default profiles can be used for the emulated users. For example, a default Profile1 can consist of 80% web browsing and 20% for VoIP. Another default Profile1 could consist of 50% web browsing, 40% email, and 10% online gaming. Yet another default Profile3 could consist of 60% peer to peer file sharing, 25% web browsing, and 15% instant messaging. Many default profiles could be defined. The distribution of the percentage use is not critical, the breakdowns are provided only to illustrate that such distributions are possible. Another embodiment of the present invention provides a method where the emulation of each activity would be done with a corresponding random application. For example, Profile1 could select a random web browser to perform the web browsing emulation, where the random web browser is picked from the group of INTERNET EXPLORER, FIREFOX, SAFARI, CHROME, and OPERA. Alternatively, a specific web browser can be specified with the default Profile1, so that Profile1 always uses INTERNET EXPLORER to emulate the web browsing traffic. Another embodiment of the present invention provides a method where profiles would be subdivided and organized by the projected operating system that can be used by a subscriber. For example, Profile1 could be further divided into WINProfile1 and LINProfile1, with WINProfile1 emulating traffic under a WINDOWS operating system using INTERNET EXPLORER, and with LINProfile1 emulating traffic under a LINUX operating system using FIREFOX or OPERA.

As previously discussed, the set of default behavior profiles can be created manually by a user, with the user specifying the characteristics of each behavior profile. When creating each behavior profile, the user can specify the type of activities that a subscriber can engage in.

Encoding meta-commands in normal network packets has been illustrated using various example protocols. The manner in which meta-commands are encoded in normal network packets will depend on the protocol being used. Similarly, the custom message elements, the string message elements, the string fields, and the numeric message elements used to encode the information will vary by protocol. The use of protocols and the formatting of packets according to a protocol are well known in the art.

While the present invention has been illustrated and described herein in terms of numerous embodiments, it is to be understood that the techniques described herein can have a multitude of additional uses and applications. Accordingly, the invention should not be limited to just the particular description and various drawing figures contained in this specification, these merely serve to illustrate embodiments and applications of the invention.

What is claimed is:

1. A method for establishing a quality of experience (QoE) score for a user activity from a plurality of user activities performed by a user over an IP network, comprising the steps of:
setting the QoE score for the user activity to an initial value;
measuring one or more network characteristics from a plurality of network characteristics and resulting in one or more network characteristics metrics, the one or more network characteristics associated with a traffic generated by the user activity;
raising one or more quality events from a plurality of quality events in response to a result from the one or more network characteristics metrics;
updating the QoE score in response to the one or more quality events;
accepting a subjective score for the user activity from the user; and
comparing the subjective score with the QoE score.

2. The method as recited in claim 1, wherein the user activity is selected from the group consisting of web browsing, sending email, receiving email, downloading a first file, uploading a second file, peer to peer file sharing, Voice over Internet Protocol (VOIP), online gaming, media streaming, and secure session.

3. The method as recited in claim 2, wherein secure session is selected from the group consisting of a virtual private network session and a hypertext transfer protocol suite secure session.

4. The method as recited in claim 1, wherein the one or more network characteristics are selected from the group consisting of a packet loss, a packet jitter, a packet latency, a corrupted packet, and a fulfill request time.

5. The method as recited in claim 1, wherein the one or more network characteristics are counted in back to back occurrence.

6. The method as recited in claim 1, wherein the one or more network characteristics are counted in occurrence per a fixed time period.

7. The method as recited in claim 1, wherein the subjective score is a number.

8. The method as recited in claim 1, wherein the subjective score is the selection of a verbal response among a set of verbal responses to a statement.

9. The method as recited in claim 1, wherein the subjective score is accepted from the user at the end of the user activity.

10. The method as recited in claim 1, wherein the step of accepting a subjective score is performed only once over a period of time.

11. The method as recited in claim 10, further comprising the step of accepting a value for the period of time from the user.

12. The method as recited in claim 1, further comprising the step of adding one or more additional network characteristics from the plurality of network characteristics to the one or more network characteristics in response to a difference between the subjective score and the QoE score being greater than a threshold.

13. The method as recited in claim 12, wherein an outlier network characteristic is removed from the one or more network characteristics if a contribution from the outlier network characteristic to the QoE score is greater than an outlier threshold.

14. The method as recited in claim 1, wherein an importance level is associated with the user activity.

15. The method as recited in claim 14, further comprising the step of allowing the user to specify the importance level.

16. The method as recited in claim 14, further comprising the step of allowing a second user to specify the importance level.

17. The method as recited in claim 16, wherein the second user is selected from the group consisting of a system administrator and an internet service provider.

18. The method as recited in claim 14, further comprising the step of adjusting the QoE score based on the importance level.

19. The method as recited in claim 1, further comprising the step of allowing the user to define a new user activity.

20. The method as recited in claim 19, wherein the new user activity includes one or more user activities from the plurality of user activities.

21. The method as recited in claim 19, further comprising the step of allowing the user to specify an application associated with the new user activity.

22. The method as recited in claim 19, further comprising the step of allowing the user to specify a port number associated with the new user activity.

23. The method as recited in claim 19, further comprising the step of allowing the user to specify a regular expression associated with the new user activity.

24. The method as recited in claim 1, further comprising the step of allowing the user to specify an application associated with the user activity.

25. The method as recited in claim 1, further comprising the step of allowing the user to specify a port number associated with the user activity.

26. The method as recited in claim 1, further comprising the step of allowing the user to specify a regular expression associated with the user activity.

27. The method as recited in claim 1, further comprising the step of allowing the user to specify an expected experience level for the user activity.

28. The method as recited in claim 1, further comprising the step of allowing a new user to specify an expected experience level for the user activity.

29. The method as recited in claim 1, further comprising the step of displaying on a display of a computer of the user the QoE score.

30. The method as recited in claim 29, further comprising the step of displaying a diagnosis associated with the QoE score.

31. The method as recited in claim 1, wherein the step of measuring one or more network characteristics further includes the step of detecting the traffic generated by the user activity based on a port number.

32. The method as recited in claim 1, wherein the step of measuring one or more network characteristics further includes the step of detecting the traffic generated by the user activity based on a list of active network connections.

33. The method as recited in claim 32, further comprising the step of parsing the list of active network connections using one or more regular expressions associated with the user activity.

34. The method as recited in claim 33, further comprising the step of allowing the user to customize the one or more regular expressions.

35. The method as recited in claim 1, wherein the step of measuring one or more network characteristics further includes the step of detecting the traffic generated by the user activity using shallow packet inspection.

36. The method as recited in claim 1, wherein the step of measuring one or more network characteristics further includes the step of detecting the traffic generated by the user activity using deep packet inspection.

37. The method as recited in claim 1, wherein the step of measuring one or more network characteristics further includes the step of detecting the traffic generated by the user activity using a packet sniffer.

38. The method as recited in claim 1, wherein the step of measuring one or more network characteristics further includes the step of detecting the traffic generated by the user activity using an application programmable interface of an application associated with the user activity.

39. The method as recited in claim 1, wherein the step of measuring one or more network characteristics further includes the step of detecting the traffic generated by the user activity using a proxy.

40. The method as recited in claim 39, wherein the proxy resides on a web browser used by the user.

41. The method as recited in claim 39, wherein the proxy resides on a modem used by the user.

42. The method as recited in claim 39, wherein the proxy resides on a router used by the user.

43. A computing device for establishing a quality of experience (QoE) score for a user activity from a plurality of user activities performed by a user over an IP network, the computing device storing computer readable instructions that, when executed on the computing device, cause the computing device to perform the steps of:
   setting the QoE score for the user activity to an initial value;
   measuring one or more network characteristics from a plurality of network characteristics and resulting in one or more network characteristics metrics, the one or more network characteristics associated with a traffic generated by the user activity;
   raising one or more quality events from a plurality of quality events in response to a result from the one or more network characteristics metrics;
   updating the QoE score in response to the one or more quality events;
   associating an importance level with the user activity; and
   adjusting the QoE score based on the importance level.

44. A computer program product embodied as a computer readable program on a non-transitory computer readable medium for establishing a quality of experience (QoE) score for a user activity from a plurality of user activities performed by a user over an IP network, the computer program comprising computer implementable instructions to cause a programmable computer to carry out the steps of:
   detecting a type of the user activity from the plurality of user activities;
   setting the QoE score for the user activity to an initial value based on the type of the user activity;
   determining one or more network characteristics from a plurality of network characteristics to measure based on the type of the user activity;
   measuring the one or more network characteristics to determine one or more network characteristics metrics, the measuring of the one or more network characteristics being associated with a traffic generated by the user activity;
   raising one or more quality events from a plurality of quality events based on the one or more network characteristics metrics, the one or more quality events being associated with one or more quality event rules; and
   updating the QoE score based on the one or more quality event rules.

* * * * *